(12) United States Patent
Altaras

(10) Patent No.: US 10,623,039 B2
(45) Date of Patent: Apr. 14, 2020

(54) DIGITAL DEVICE PROTECTIVE CASE METHOD AND DEVICE

(71) Applicant: Eli Altaras, Irvine, CA (US)

(72) Inventor: Eli Altaras, Irvine, CA (US)

( * ) Notice: Subject to any disclaimer, the term of this patent is extended or adjusted under 35 U.S.C. 154(b) by 0 days.

(21) Appl. No.: 15/840,718

(22) Filed: Dec. 13, 2017

(65) Prior Publication Data

US 2019/0182376 A1 Jun. 13, 2019

(51) Int. Cl.

| | |
|---|---|
| *H04B 1/3888* | (2015.01) |
| *H04M 1/18* | (2006.01) |
| *H04M 1/725* | (2006.01) |
| *A45C 11/00* | (2006.01) |
| *A45C 15/00* | (2006.01) |
| *H02J 7/35* | (2006.01) |
| *H02J 7/02* | (2016.01) |
| *G06K 9/00* | (2006.01) |
| *H04L 29/06* | (2006.01) |
| *G06F 21/32* | (2013.01) |
| *H04W 12/06* | (2009.01) |
| *H02J 50/10* | (2016.01) |

(52) U.S. Cl.
CPC ............ *H04B 1/3888* (2013.01); *A45C 11/00* (2013.01); *A45C 15/00* (2013.01); *G06F 21/32* (2013.01); *G06K 9/0002* (2013.01); *G06K 9/00087* (2013.01); *H02J 7/025* (2013.01); *H02J 7/355* (2013.01); *H02J 50/10* (2016.02); *H04L 63/083* (2013.01); *H04M 1/185* (2013.01); *H04M 1/7253* (2013.01); *H04M 1/72575* (2013.01); *H04W 12/06* (2013.01); *A45C 2011/002* (2013.01); *A45C 2200/10* (2013.01)

(58) Field of Classification Search
CPC ...... A45C 2011/002–003; A45C 15/00; A45C 11/00; H04B 1/3888
See application file for complete search history.

(56) References Cited

U.S. PATENT DOCUMENTS

| | | | | |
|---|---|---|---|---|
| 7,938,260 | B2 * | 5/2011 | Lin ........................ | A45C 11/00 206/320 |
| 9,472,909 | B2 * | 10/2016 | Ginsberg ............... | H01R 13/72 |
| 9,735,595 | B2 * | 8/2017 | Colahan ................ | H02J 7/0045 |

(Continued)

FOREIGN PATENT DOCUMENTS

| | | | |
|---|---|---|---|
| CN | 104970527 A | * | 10/2015 |
| KR | 101433009 B1 | * | 8/2014 |

*Primary Examiner* — Gennadiy Tsvey

(57) ABSTRACT

The embodiments disclose a method for creating a digital device protective case with added features to protect and upgrade a user cell phone, including integrating internal air cushion pockets to create a digital device air cushioned protective case, installing a digital device air cushioned protective case tempered glass back cover, integrating a fingerprint recognition device locking system to the tempered glass back cover, integrating a solar cell recharging power source to the tempered glass back cover, integrating an energy induction coil recharging system to the tempered glass back cover, creating a USB plug with digital and recharging features for plugging into a user cell phone, integrating a WIFI direct-near field communication transmitter, a digital memory device, a digital microprocessor and an energy converter into the USB plug with digital and recharging features, and creating an energy induction coil recharging pad.

9 Claims, 22 Drawing Sheets

(56) References Cited

U.S. PATENT DOCUMENTS

| | | | |
|---|---|---|---|
| 9,768,822 B1* | 9/2017 | Loh | H04M 1/185 |
| 9,872,546 B2* | 1/2018 | Kim | A45C 13/36 |
| 9,882,595 B2* | 1/2018 | Tranchida | A45C 11/00 |
| 10,027,783 B2* | 7/2018 | Dukerschein | A45C 13/02 |
| 2001/0045458 A1* | 11/2001 | Polansky | G06K 19/10 |
| | | | 235/382 |
| 2010/0089779 A1* | 4/2010 | Bowers | A45C 7/0095 |
| | | | 206/320 |
| 2011/0228459 A1* | 9/2011 | Richardson | H04M 1/185 |
| | | | 361/679.01 |
| 2012/0118773 A1* | 5/2012 | Rayner | G06F 1/1626 |
| | | | 206/320 |
| 2012/0325720 A1* | 12/2012 | Tages | H04B 1/3888 |
| | | | 206/522 |
| 2013/0042581 A1* | 2/2013 | Holben | H04B 1/3888 |
| | | | 53/473 |
| 2013/0273944 A1* | 10/2013 | Wilson | H04W 4/90 |
| | | | 455/457 |
| 2014/0183064 A1* | 7/2014 | Ge | A45C 11/00 |
| | | | 206/37 |
| 2014/0216973 A1* | 8/2014 | Chang | B65D 81/022 |
| | | | 206/521 |
| 2014/0265762 A1* | 9/2014 | Murphy | B23P 19/00 |
| | | | 312/223.1 |
| 2014/0339104 A1* | 11/2014 | Magness | A45C 11/00 |
| | | | 206/37 |
| 2015/0068935 A1* | 3/2015 | Kay | A45C 13/36 |
| | | | 206/320 |
| 2015/0207360 A1* | 7/2015 | Adams | H02J 7/35 |
| | | | 320/101 |
| 2015/0270734 A1* | 9/2015 | Davison | H02J 7/0054 |
| | | | 320/103 |
| 2015/0370288 A1* | 12/2015 | Dinesh | H04B 1/3888 |
| | | | 455/566 |
| 2016/0013828 A1* | 1/2016 | Pan | H04B 1/385 |
| | | | 455/575.6 |
| 2016/0021996 A1* | 1/2016 | Tien | A45C 11/00 |
| | | | 224/191 |
| 2016/0049980 A1* | 2/2016 | Kim | H04B 1/3888 |
| | | | 455/575.8 |
| 2016/0134142 A1* | 5/2016 | Murphy | H02J 7/0054 |
| | | | 455/573 |
| 2016/0182114 A1* | 6/2016 | Tien | H04B 1/3888 |
| | | | 224/191 |
| 2016/0227896 A1* | 8/2016 | Chien | A45C 11/00 |
| 2017/0033824 A1* | 2/2017 | Tien | H04B 1/3888 |
| 2017/0201285 A1* | 7/2017 | Liu | H04B 1/3888 |
| 2017/0311465 A1* | 10/2017 | Adelmann | G06F 1/1613 |
| 2018/0295731 A1* | 10/2018 | Burdoucci | H05K 5/0086 |
| 2019/0250487 A1* | 8/2019 | Barros | G03B 17/14 |

* cited by examiner

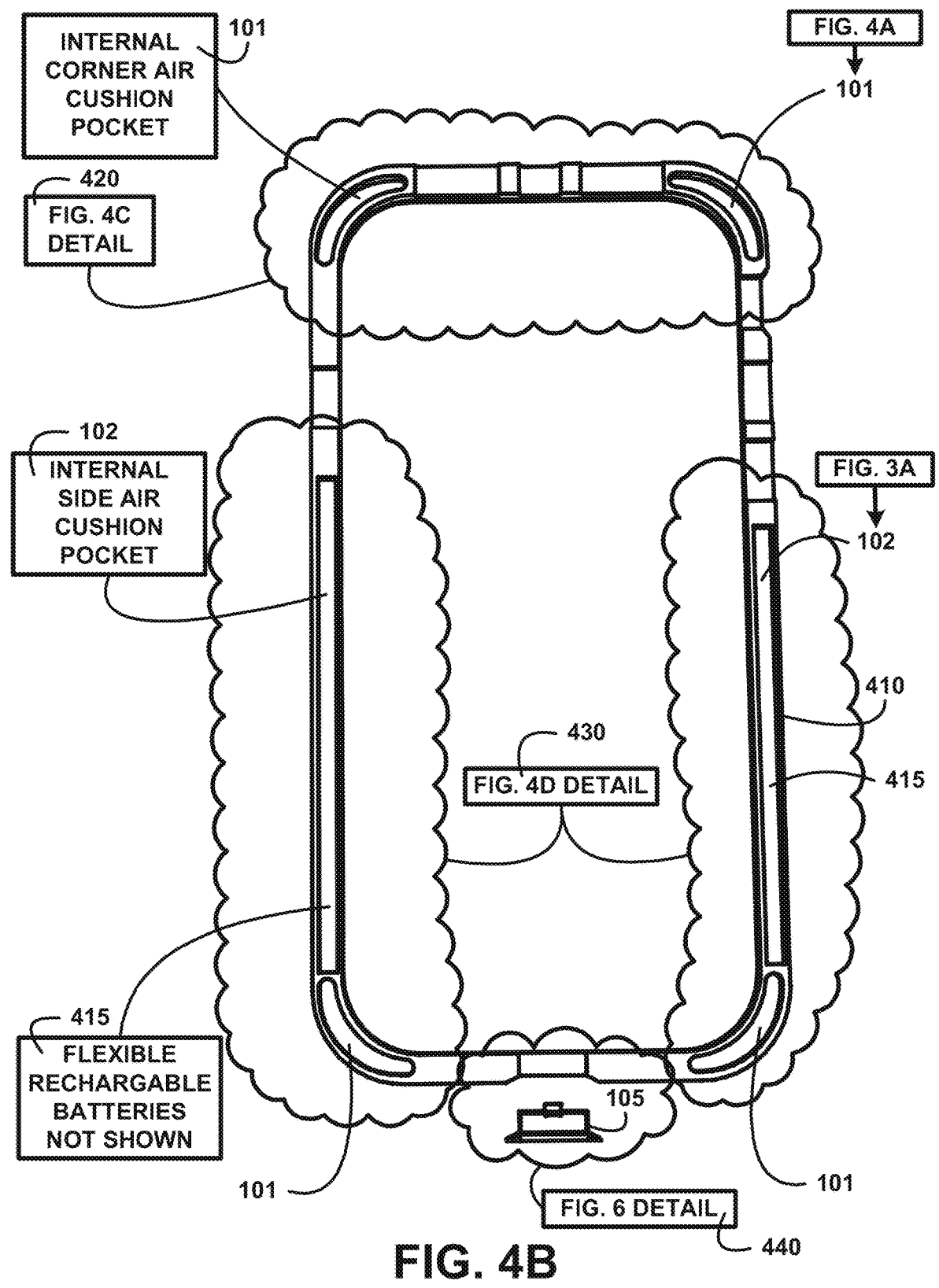

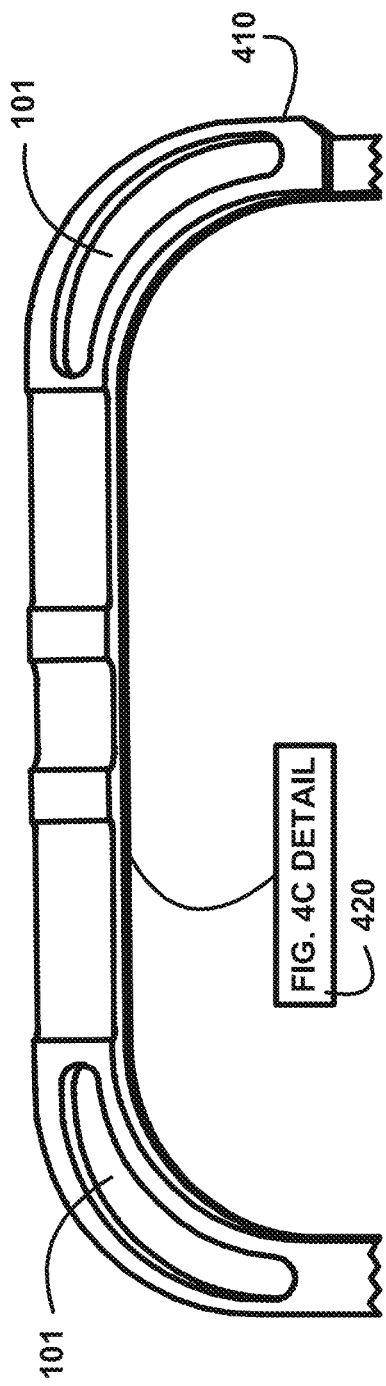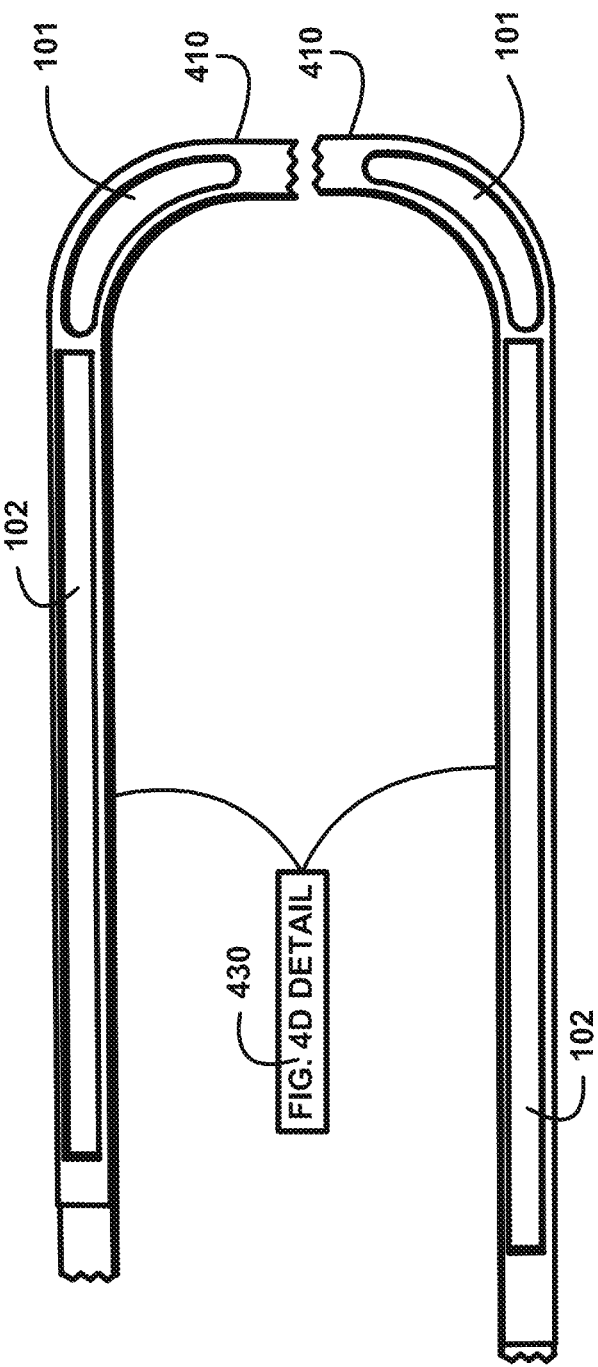

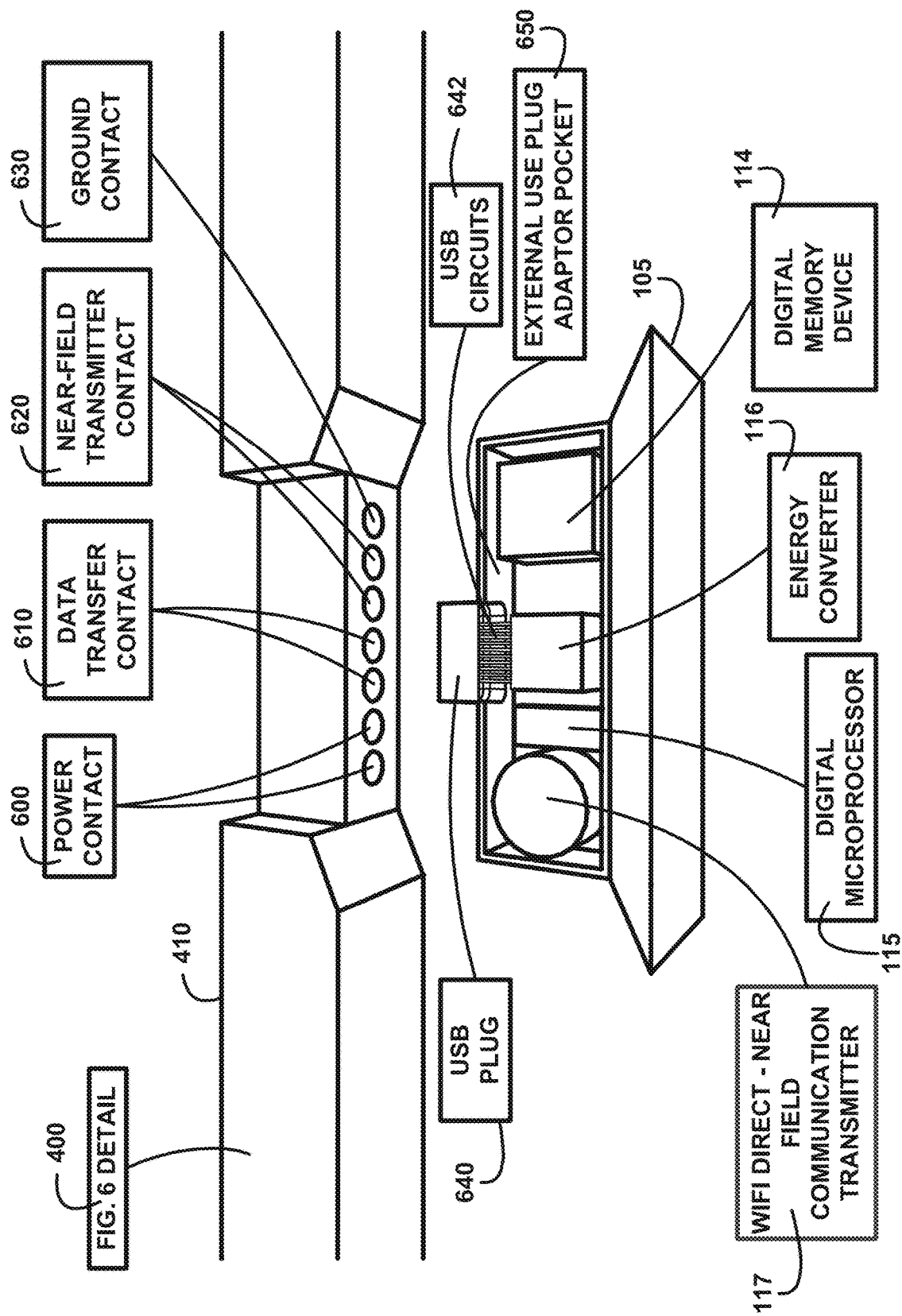

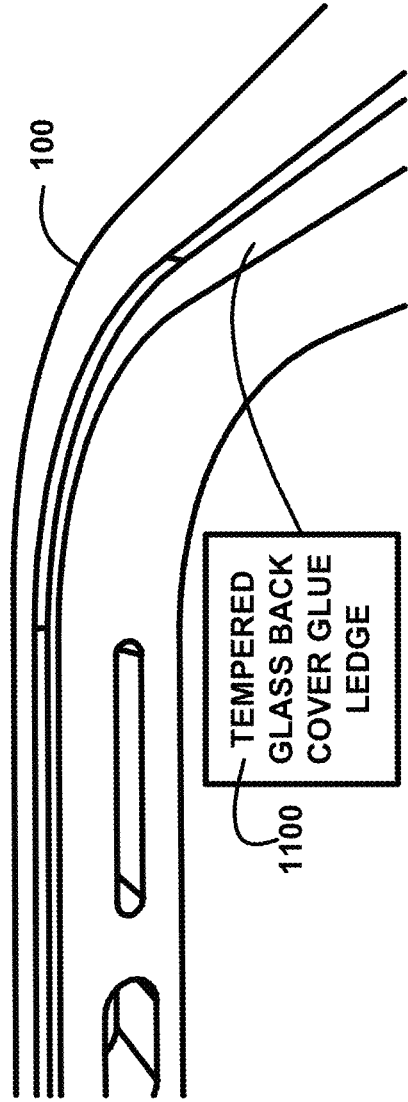
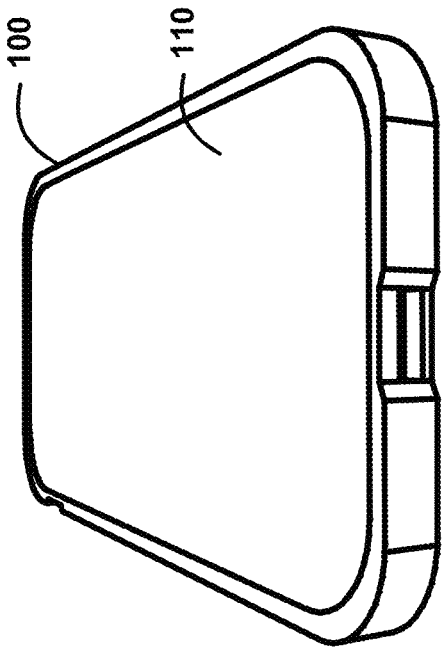
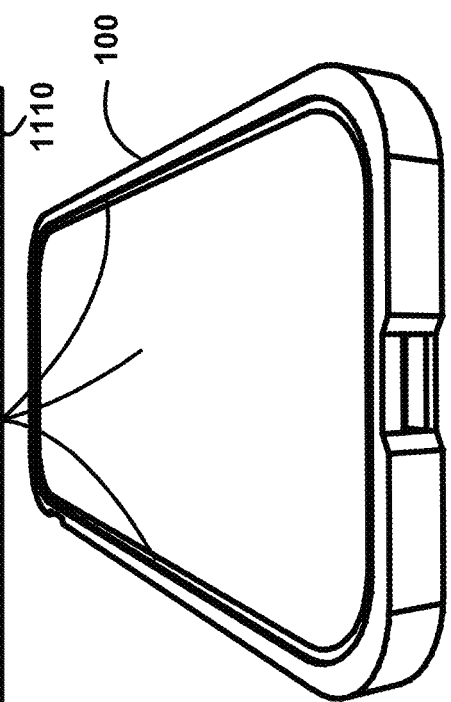
FIG. 11A
FIG. 11C
FIG. 11B

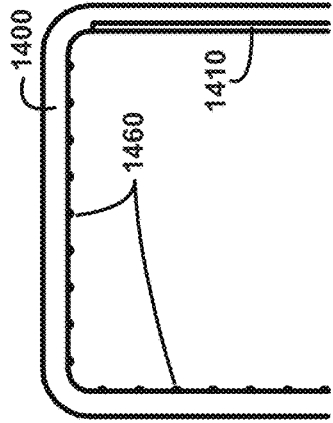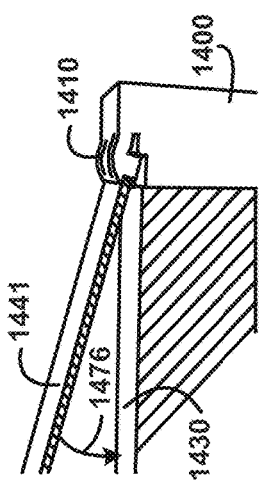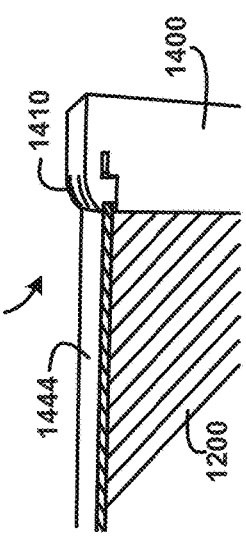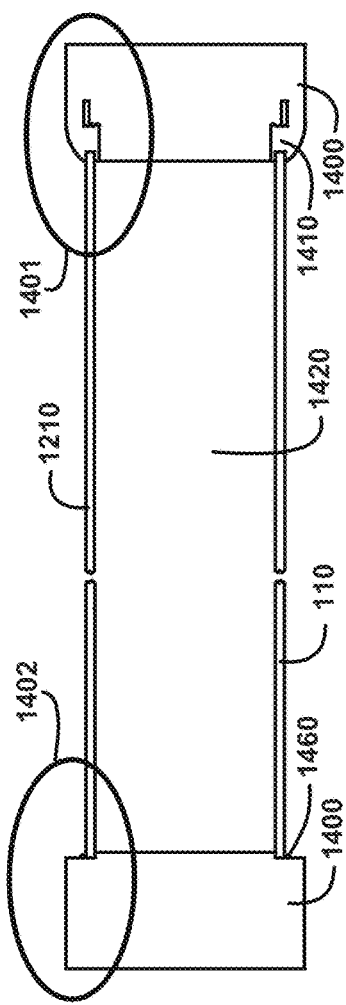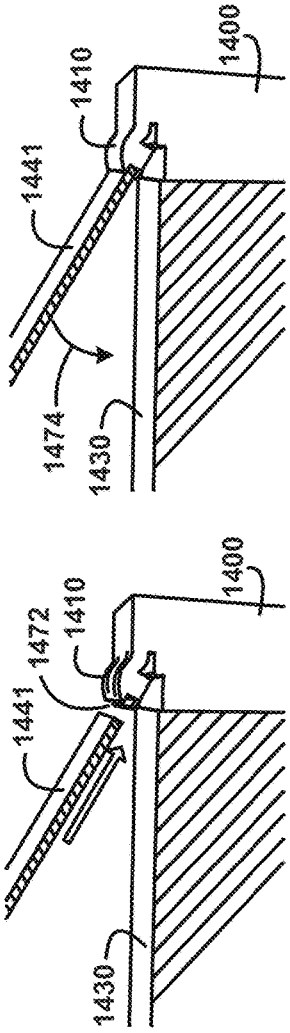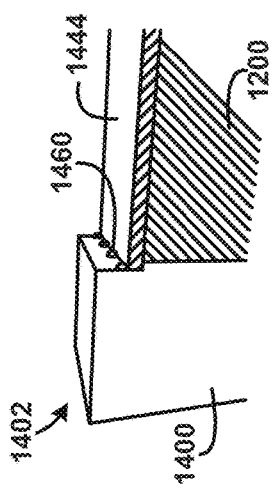

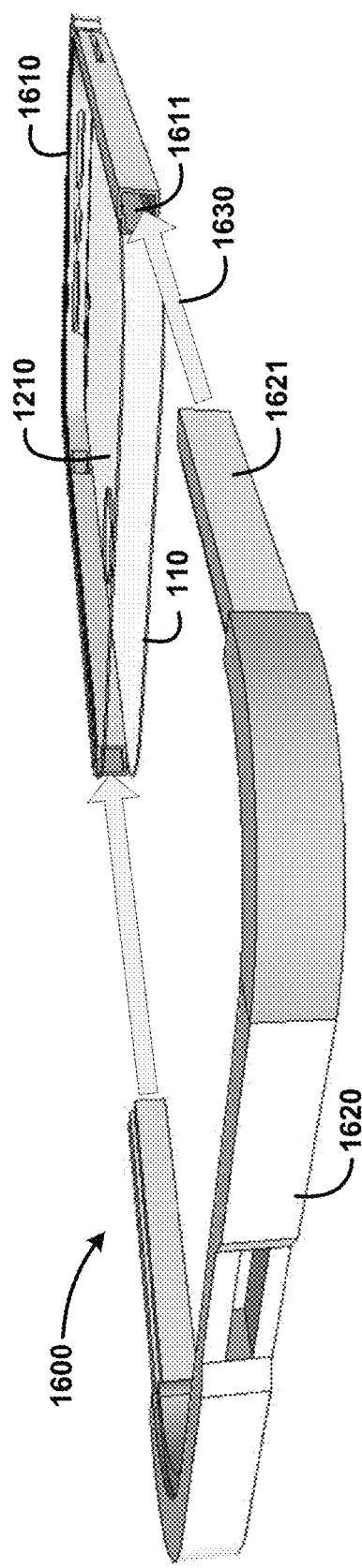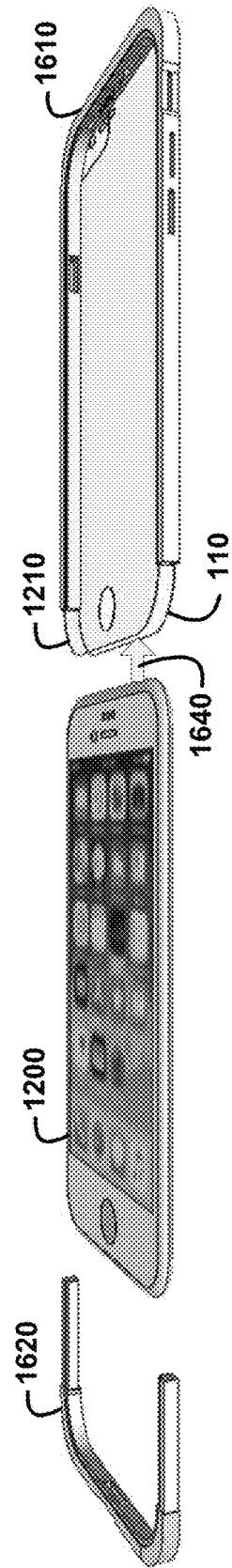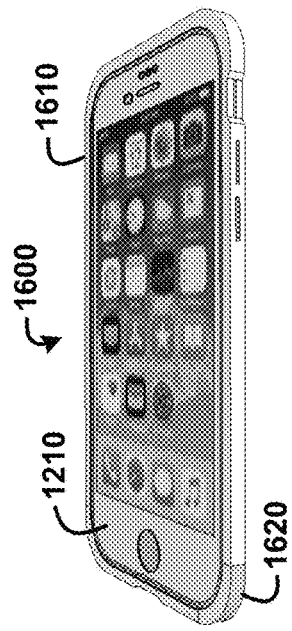
FIG. 16A
FIG. 16B
FIG. 16C
FIG. 16D

DIGITAL DEVICE PROTECTIVE CASE METHOD AND DEVICE

BACKGROUND

Many of the newer smart phones have sophisticated lock device systems including iris, voice and fingerprint recognition. Many people cannot afford those high end phones. Also many people cannot afford to pay to replace the cell phone they have if it dropped and breaks. What is needed is a device that provides more than normal protection and offers features that can be added on to a lower end phone that can bring those features to those who simply cannot afford to buy a high end phone replacement.

BRIEF DESCRIPTION OF THE DRAWINGS

FIG. 4B shows for illustrative purposes only an example of an air cushion pockets of one embodiment.

FIG. 4C shows for illustrative purposes only an example of corner air cushion pockets of one embodiment.

FIG. 4D shows for illustrative purposes only an example of side air cushion pockets of one embodiment.

FIG. 6 shows for illustrative purposes only an example of a USB plug with digital and recharging features of one embodiment.

FIG. 11A shows for illustrative purposes only an example of case with glue ledge of one embodiment.

FIG. 11B shows for illustrative purposes only an example of case with solid rubber glue platform of one embodiment.

FIG. 11C shows for illustrative purposes only an example of digital device air cushioned protective case with glued tempered glass back of one embodiment.

FIG. 14A shows for illustrative purposes only an example of a profile view of a protective case with slip and snap tempered glass cover installation features of one embodiment.

FIG. 14B shows for illustrative purposes only an example of a top view of a protective case with slip and snap tempered glass cover installation features of one embodiment.

FIG. 14C shows for illustrative purposes only an example of slipping a tempered glass cover into a slip and snap tempered glass cover slot installation feature of one embodiment.

FIG. 14D shows for illustrative purposes only an example of a flexible slip and snap tempered glass cover installation feature pushed toward a cell phone glass surface of one embodiment.

FIG. 14E shows for illustrative purposes only an example of a flexible slip and snap tempered glass cover installation feature continuing a push toward a cell phone glass surface of one embodiment.

FIG. 14F shows for illustrative purposes only an example of a flexible slip and snap tempered glass cover installation pressed against a cell phone glass surface of one embodiment.

FIG. 14G shows for illustrative purposes only an example of a flexible slip and snap tempered glass cover installation tempered glass cover snap locking feature of one embodiment.

FIG. 16A shows for illustrative purposes only an example of a two-part slide and snap together protective case with glued tempered glass covers of one embodiment.

FIG. 16B shows for illustrative purposes only an example of a cell phone insertion into a slide receiver section of a two-part slide and snap together protective case with glued tempered glass covers of one embodiment.

FIG. 16C shows for illustrative purposes only an example of sliding a slider section into a receiver section of a two-part slide and snap together protective case with glued tempered glass covers of one embodiment.

FIG. 16D shows for illustrative purposes only an example of a cell phone installed in a two-part slide and snap together protective case with glued tempered glass covers of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the embodiments.

General Overview

It should be noted that the descriptions that follow, for example, in terms of digital device air cushioned protective case method and device is described for illustrative purposes and the underlying system can apply to any number and multiple types of digital devices. In one embodiment of the present invention, the digital device air cushioned protective case method and device can be configured using various specific digital device model customized shapes and sizes. The digital device air cushioned protective case method and device can be configured to include air cushion pocket shock absorbing case components and can be configured to include a tempered glass back and provide external features to upgrade a user phone using the embodiments.

Figure 1:
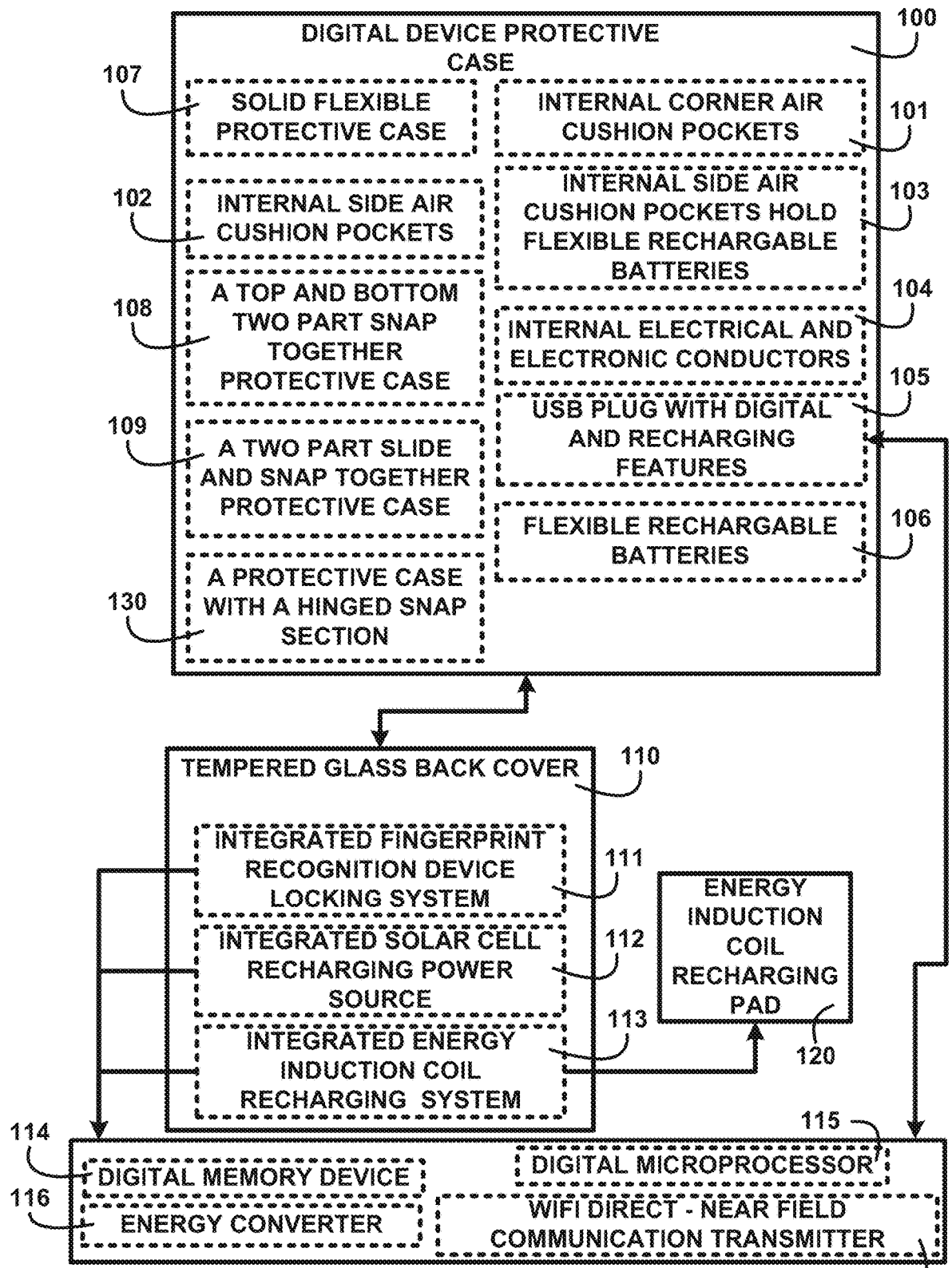
FIG. 1 shows a block diagram of an overview of a digital device protective case method and device of one embodiment.

FIG. 1 shows a block diagram of an overview of a digital device air cushioned protective case method and device of one embodiment. FIG. 1 shows a digital device protective case 100 can include a solid flexible protective case 107, a digital device air cushioned protective case including internal corner air cushion pockets 101 and internal side air cushion pockets 102, a top and bottom two-part snap together protective case 108, a two-part slide and snap together protective case 109, and a protective case with a hinged snap section 130. Internal side air cushion pockets hold flexible rechargeable batteries 103. The internal side air cushion pockets 102 are also configured to be a chase to install internal electrical and electronic conductors 104 of one embodiment.

A USB plug with digital and recharging features 105 is configured to be inserted in a typical cell phone USB recharging and data link receptacle. The USB plug with digital and recharging features 105 is configured to include a digital memory device 114, a digital microprocessor 115, an energy converter 116, and WIFI direct—near field communication transmitter 117. Flexible rechargeable batteries 106 are configured to be charged by digital device air cushioned protective case device tempered glass back cover 110 power source features of one embodiment.

The tempered glass back cover 110 is configured to include an integrated fingerprint recognition device locking system 111, an integrated solar cell recharging power source 112 and an integrated energy induction coil recharging system 113. The integrated energy induction coil recharging system 113 can intake power from an energy induction coil recharging pad 120. Throughout the description reference is made to tempered glass which is for ease of the description, but laminated glass could in all instances be interpreted as another type of glass to be used of one embodiment.

DETAILED DESCRIPTION

Figure 2:
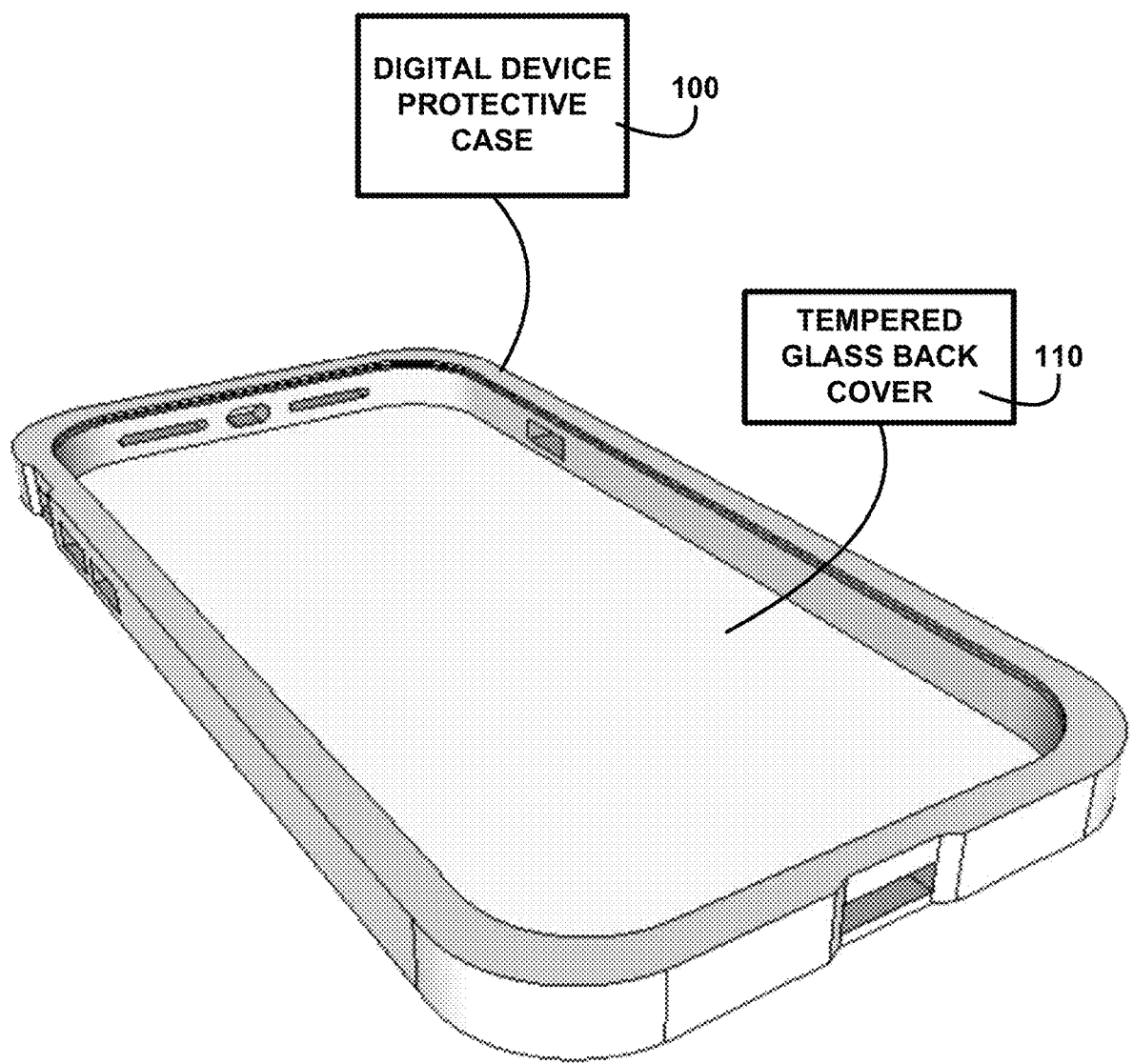
FIG. 2 shows for illustrative purposes only an example of a digital device protective case of one embodiment.

FIG. 2 shows for illustrative purposes only an example of a digital device air cushioned protective case of one embodiment. FIG. 2 shows the digital device protective case 100 with the tempered glass back cover 110 installed of one embodiment.

Figure 3:
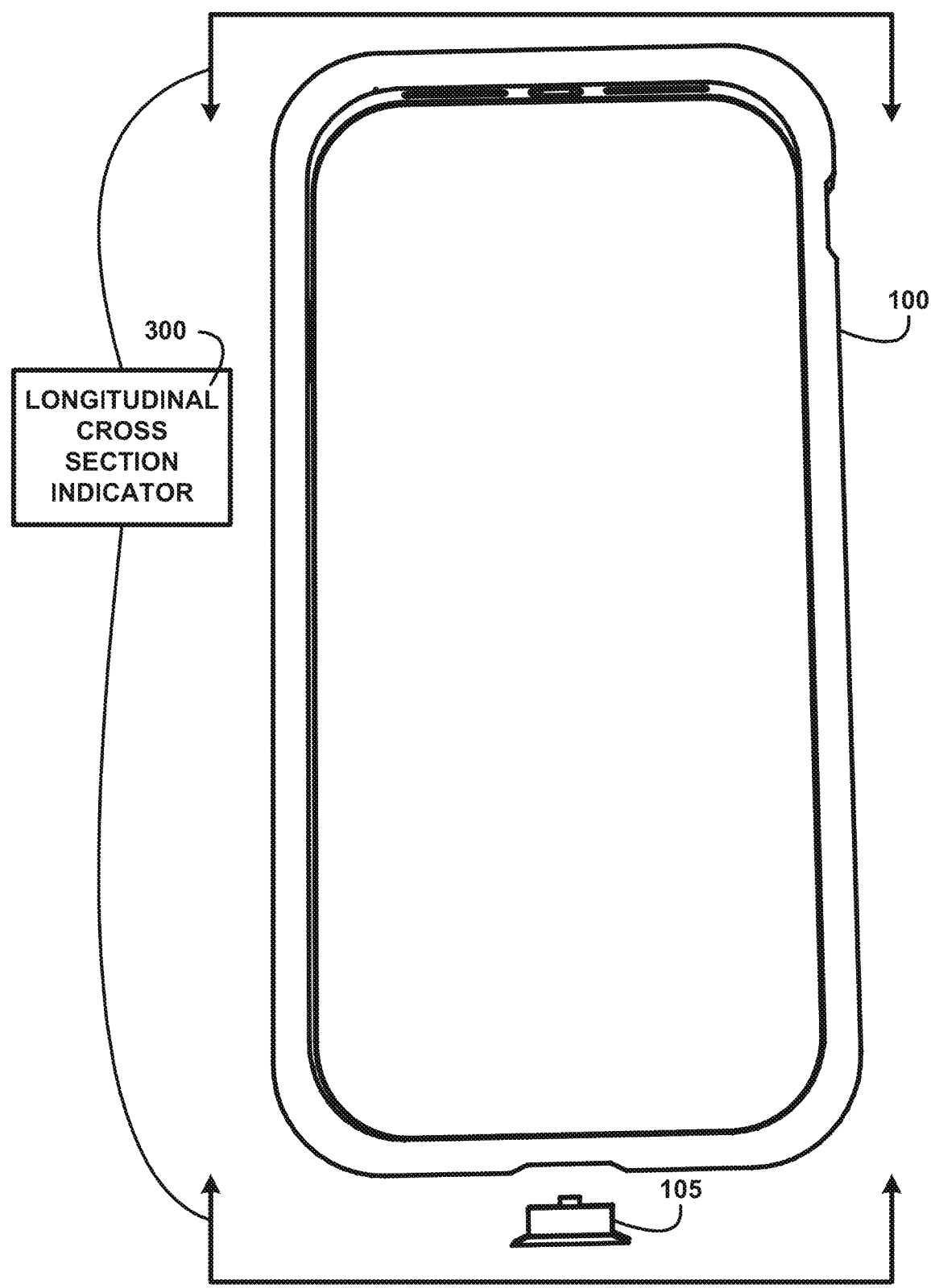
FIG. 3 shows for illustrative purposes only an example of a digital device air cushioned protective case longitudinal cross section of one embodiment.

Digital Device Air Cushioned Protective Case Longitudinal Cross Section:

FIG. 3 shows for illustrative purposes only an example of a digital device air cushioned protective case longitudinal cross section of one embodiment. FIG. 3 shows the digital device protective case 100 made with for example a flexible rubber including thermoplastic polyurethane (TPU). Air cushion pockets can be integrated into a mold and molding process. The FIG. 3 illustration also shows two longitudinal cross section indicator 300 to show the relationship to the cross section shown in FIG. 4B. Also shown is the USB plug with digital and recharging features 105 shown in more detail in FIG. 6 of one embodiment.

Figure 4A:
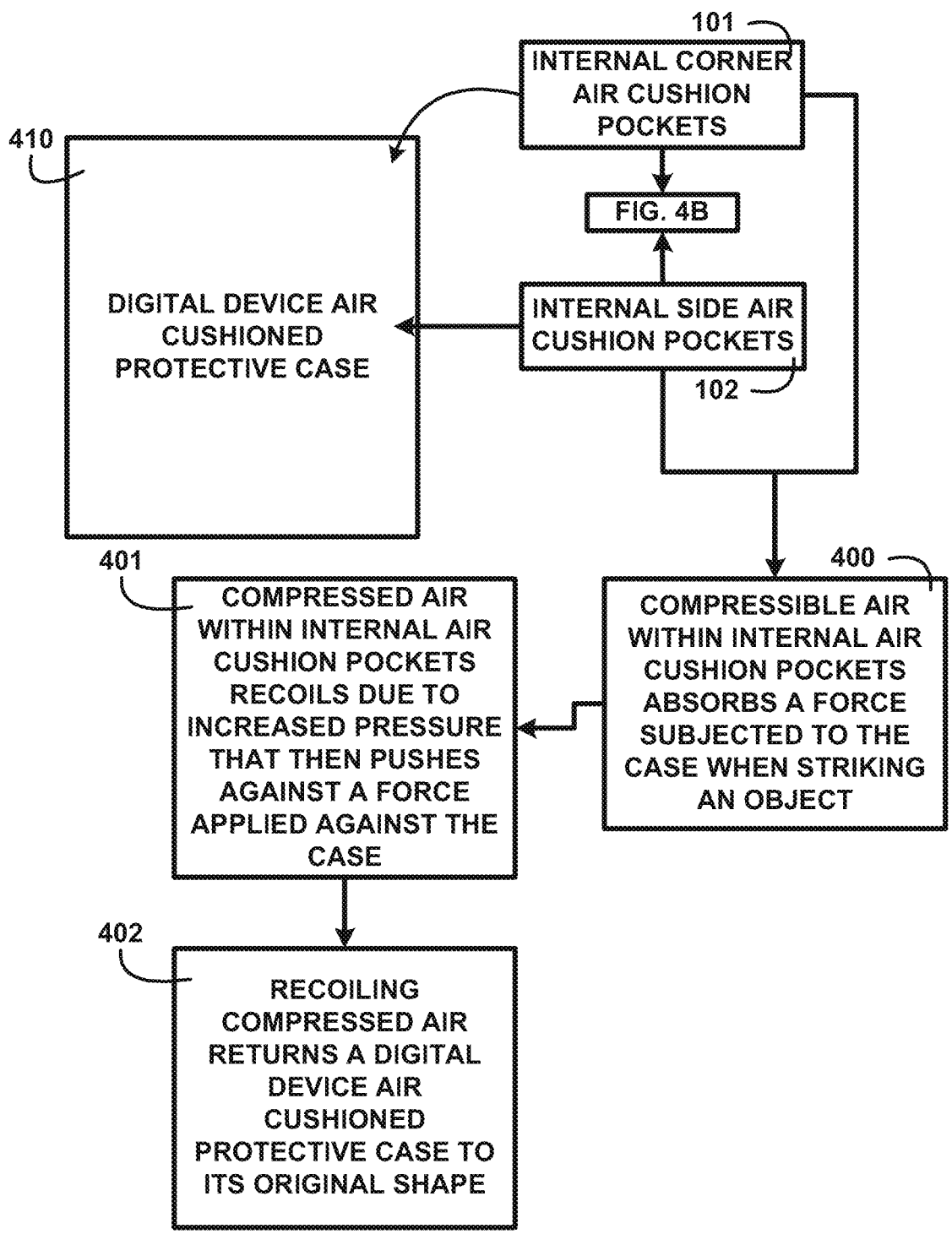
FIG. 4A shows a block diagram of an overview of a digital device air cushioned protective case air cushion pockets of one embodiment.

Digital Device Air Cushioned Protective Case Air Cushion Pockets:

FIG. 4A shows a block diagram of an overview of a digital device air cushioned protective case air cushion pockets of one embodiment. FIG. 4A shows the digital device air cushioned protective case 410 that includes the integrated internal corner air cushion pockets 101 and internal side air cushion pockets 102 shown in more detail in FIG. 4B. Compressible air within internal air cushion pockets absorbs a force subjected to the case when striking an object 400. Compressed air within internal air cushion pockets recoils due to increased pressure that then pushes against a force applied against the case 401. Recoiling compressed air returns a digital device air cushioned protective case to its original shape 402 of one embodiment.

Corner Air Cushion Pockets:

FIG. 4B shows for illustrative purposes only an example of an air cushion pockets of one embodiment. FIG. 4B shows the longitudinal cross section indicated in FIG. 4A. Clearly visible is the internal corner air cushion pocket 101 also shown in FIG. 4C detail 420. Visible also is the internal side air cushion pocket 102. The internal side air cushion pocket 102 cavity is configured to hold flexible rechargeable batteries not shown 415. The internal side air cushion pocket 102 is also shown in FIG. 4D detail 430. FIG. 4B shows the USB plug with digital and recharging features 105 that plugs into the digital device air cushioned protective case 410 and cell phone installed in the digital device air cushioned protective case 410. A detailed view of the USB plug with digital and recharging features 105 is shown in FIG. 6 detail 440 of one embodiment.

Figure 5A:
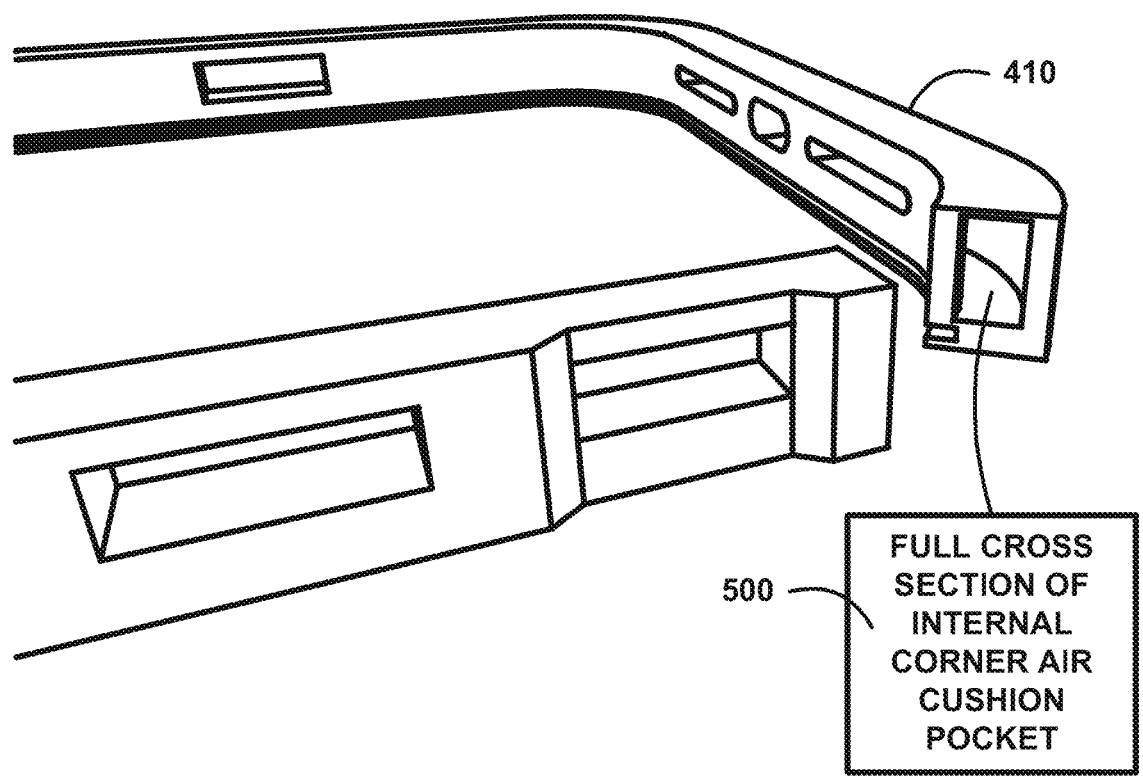
FIG. 5A shows for illustrative purposes only an example of a full cross section of internal corner air cushion pocket of one embodiment.

Corner Air Cushion Pockets:

FIG. 4C shows for illustrative purposes only an example of corner air cushion pockets of one embodiment. FIG. 4C shows the digital device air cushioned protective case 410 including FIG. 4C detail 420 of two of the internal air cushion corner pocket 101 features. FIG. 5A shows a view of the full internal air cushion corner pocket 101 of one embodiment.

Side Air Cushion Pockets:

FIG. 4D shows for illustrative purposes only an example of side air cushion pockets of one embodiment. FIG. 4D shows FIG. 4D detail 430 of the internal side air cushion pocket 102 features. The digital device air cushioned protective case 410 includes the internal corner air cushion pocket 101 which shows a position relationship to the internal side air cushion pocket 102 of one embodiment.

Full Cross Section of Internal Corner Air Cushion Pocket:

FIG. 5A shows for illustrative purposes only an example of a full cross section of internal corner air cushion pocket of one embodiment. FIG. 5A shows the digital device air cushioned protective case 410 with a full cross section of internal corner air cushion pocket 500 cavity of one embodiment.

Figure 5B:
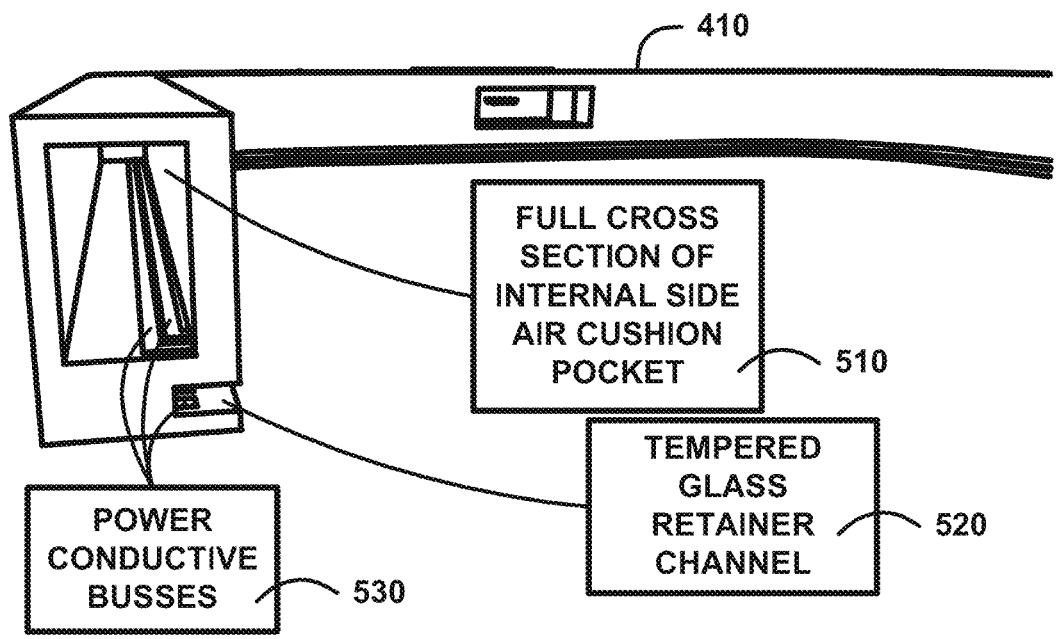
FIG. 5B shows for illustrative purposes only an example of a tempered glass retain channel of one embodiment.

Tempered Glass Retainer Channel:

FIG. 5B shows for illustrative purposes only an example of a tempered glass retainer channel of one embodiment. FIG. 5B shows the digital device air cushioned protective case 410 with a full cross section of internal side air cushion pocket 510 including a tempered glass retainer channel 520. Power conductive busses 530 are shown installed inside the internal side air cushion pocket 102 cavities. The power conductive busses 530 extend thru the digital device air cushioned protective case 410 and are exposed in the tempered glass retainer channel 520. A conductive contact can be made here between the power conductive busses 530 and circuit terminal contacts of the flexible rechargeable batteries 106, the integrated solar cell recharging power source 112, and the integrated energy induction coil recharging system 113 of one embodiment.

USB Plug with Digital and Recharging Features:

FIG. 6 shows for illustrative purposes only an example of a USB plug with digital and recharging features of one embodiment. FIG. 6 shows the digital device air cushioned protective case 410 and the FIG. 6 detail 440 of the USB plug with digital and recharging features 105. The digital device air cushioned protective case 410 is configured to include at the USB port power contact 600, data transfer contact 610, near-field transmitter contact 620, and ground contact 630.

The USB plug with digital and recharging features 105 is configured to include a USB plug 640, USB circuits 642 and an external use plug adaptor pocket 650. The external use plug adaptor pocket 650 is configured to form a compartment for installations of a WIFI direct—near field communication transmitter 117, the digital microprocessor 115, the energy converter 116, and the digital memory device 114 of one embodiment.

Figure 7A:
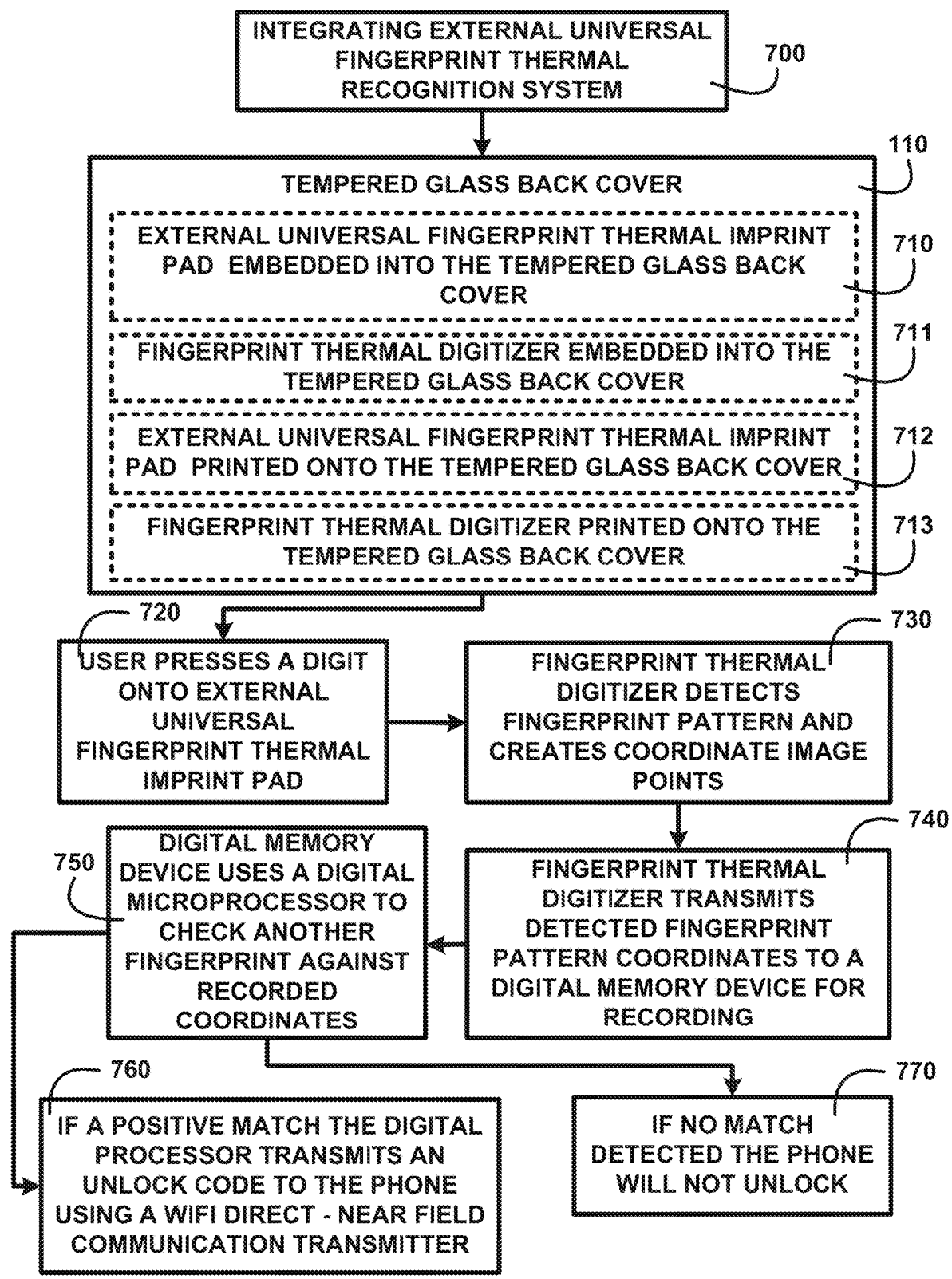
FIG. 7A shows a block diagram of an overview of integrating external universal fingerprint thermal recognition system of one embodiment.

Integrating External Universal Fingerprint Thermal Recognition System:

FIG. 7A shows a block diagram of an overview of an integrating external universal fingerprint thermal recognition system of one embodiment. FIG. 7A shows an integrating external universal fingerprint thermal recognition system 700 to the tempered glass back cover 110. Integrating external universal fingerprint thermal recognition system 700 can include using an external universal fingerprint thermal imprint pad embedded into the tempered glass back cover 710, fingerprint thermal digitizer embedded into the tempered glass back cover 711, external universal fingerprint thermal imprint pad printed onto the tempered glass back cover 712, and fingerprint thermal digitizer printed onto the tempered glass back cover 713 of one embodiment.

A user presses a digit onto external universal fingerprint thermal imprint pad 720. A fingerprint thermal digitizer detects fingerprint pattern and creates coordinate image points 730. A fingerprint thermal digitizer transmits detected fingerprint pattern coordinates to a digital memory device for recording 740. A digital memory device uses a digital microprocessor to check another fingerprint against recorded coordinates 750. If a positive match the digital processor transmits an unlock code to the phone using a WIFI direct—near field communication transmitter 760. If no match detected the phone will not unlock 770. Integrating external universal fingerprint thermal recognition system 700 into the digital device protective case 100 of FIG. 1 can provide a user with a sophisticated locking system that is not a normal feature of their existing cell phone of one embodiment.

Figure 7B:
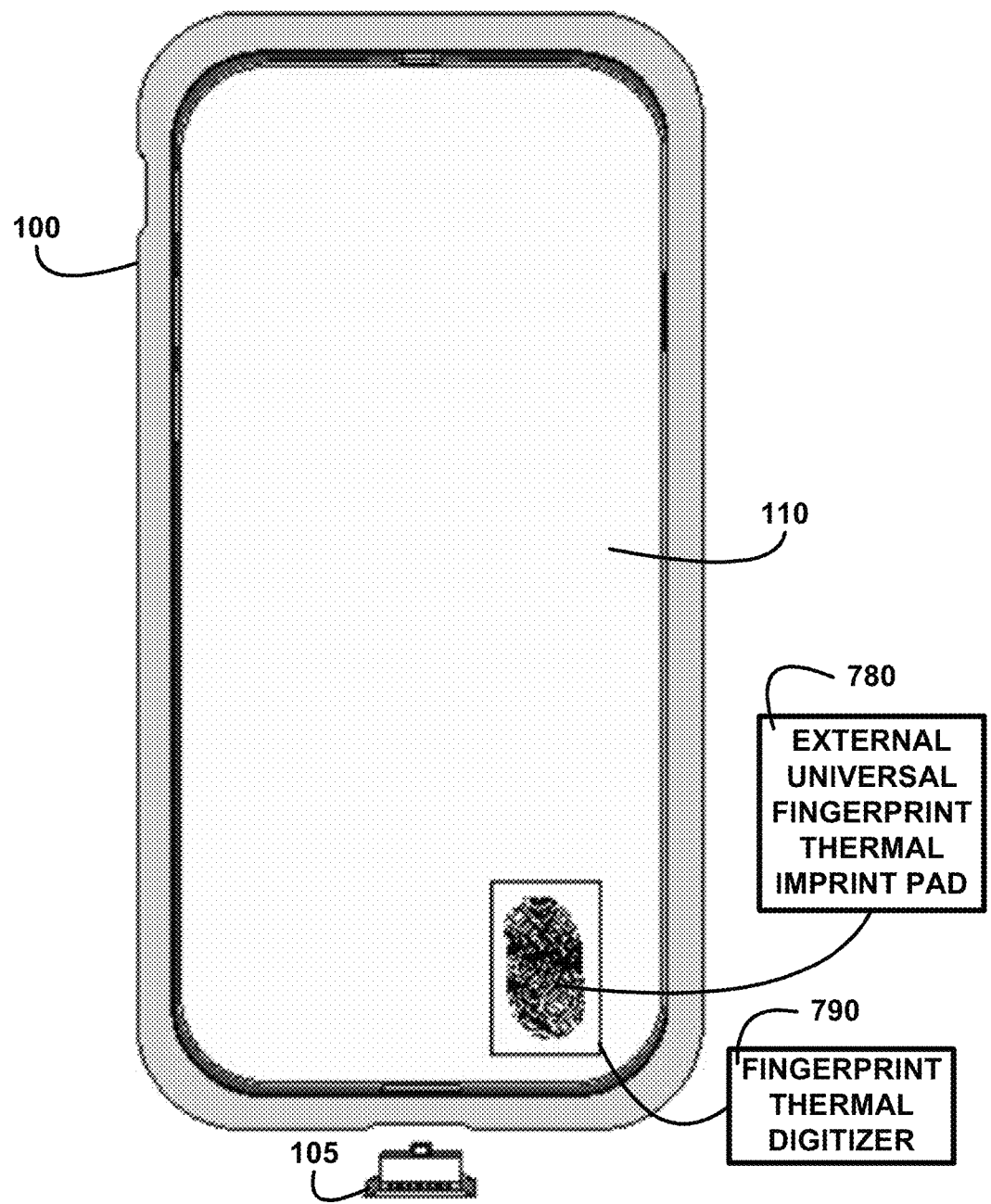
FIG. 7B shows for illustrative purposes only an example of external universal fingerprint thermal imprint pad of one embodiment.

External Universal Fingerprint Thermal Imprint Pad:

FIG. 7B shows for illustrative purposes only an example of external universal fingerprint thermal imprint pad of one embodiment. FIG. 7B shows the digital device protective case 100 with the tempered glass back cover 110 installed. The USB plug with digital and recharging features 105 is also installed (not shown). The tempered glass back cover 110 includes an external universal fingerprint thermal imprint pad 780 and fingerprint thermal digitizer 790 integrated with the tempered glass back cover 110 of one embodiment.

Figure 8A:
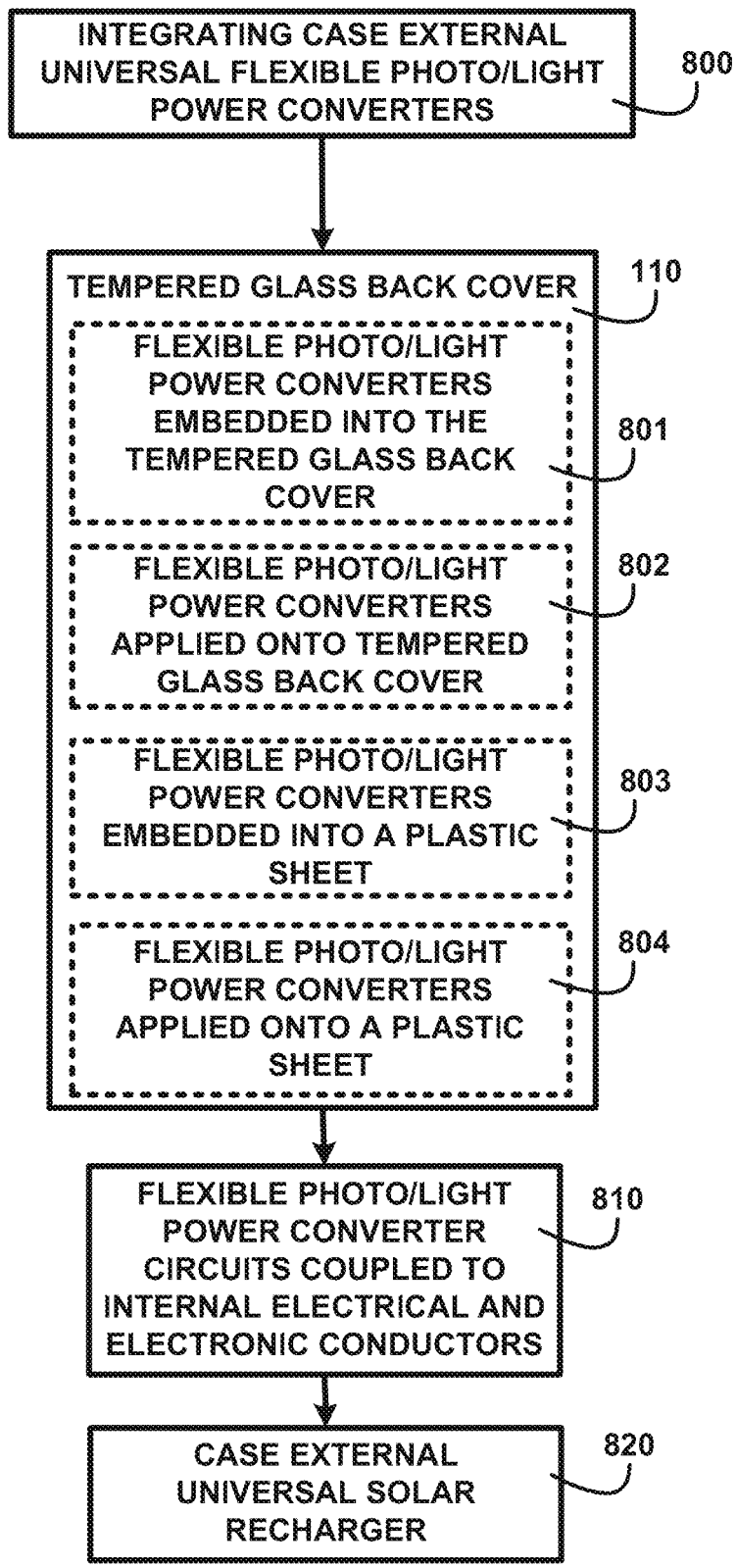
FIG. 8A shows a block diagram of an overview of integrating case external universal flexible photo/light power converters of one embodiment.

Integrating Case External Universal Flexible Photo/Light Power Converters:

FIG. 8A shows a block diagram of an overview of an integrating case external universal flexible photo/light power converters of one embodiment. FIG. 8A shows integrating case external universal flexible photo/light power converters 800 to the tempered glass back cover 110. Integrating case external universal flexible photo/light power converters 800 can include using a flexible photo/light power converters embedded into the tempered glass back cover 801, a flexible photo/light power converters applied onto tempered glass back cover 802, a flexible photo/light power converters embedded into a plastic sheet 803, and a flexible photo/light power converters applied onto a plastic sheet 804 of one embodiment.

Flexible photo/light power converter circuits coupled to internal electrical and electronic conductors 810 creates a case external universal solar recharger 820. Integrating case external universal flexible photo/light power converters 800 into the digital device protective case 100 of FIG. 1 can provide a user with a sophisticated solar recharger system that is not a normal feature of their existing cell phone of one embodiment.

Figure 8B:
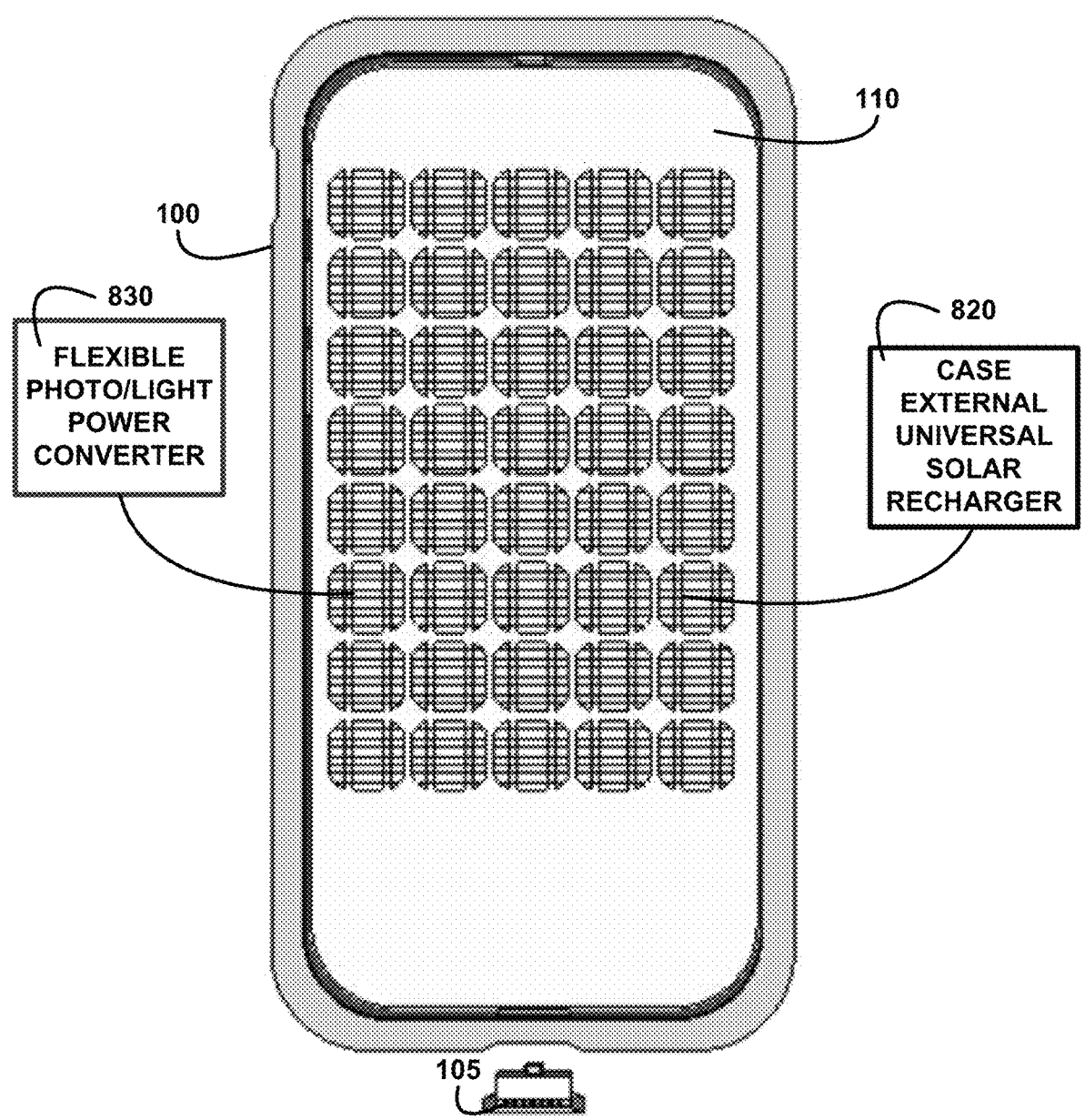
FIG. 8B shows for illustrative purposes only an example of case external universal solar recharger of one embodiment.

Case External Universal Solar Recharger:

FIG. 8B shows for illustrative purposes only an example of case external universal solar recharger of one embodiment. FIG. 8B shows the digital device protective case 100 with the tempered glass back cover 110 installed. The tempered glass back cover 110 includes an array of a plurality of flexible photo/light power converter 830 devices to create a case external universal solar recharger 820. Also shown is the USB plug with digital and recharging features 105 of one embodiment.

Figure 9A:
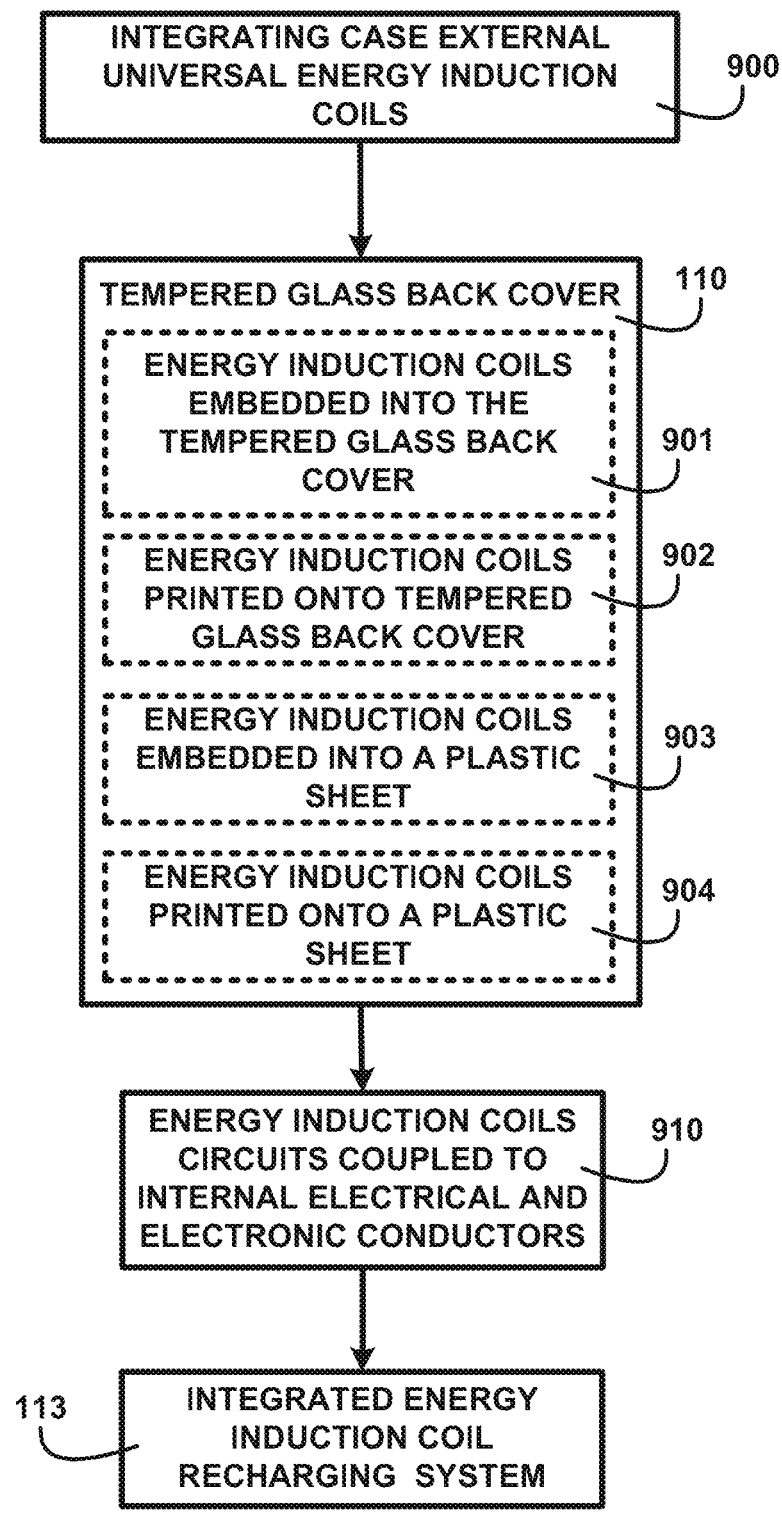
FIG. 9A shows a block diagram of an overview of integrating case external universal energy induction coils of one embodiment.

Integrating Case External Universal Energy Induction Coils:

FIG. 9A shows a block diagram of an overview of an integrating case external universal energy induction coils of one embodiment. FIG. 9A shows integrating case external universal energy induction coils 900 to the tempered glass back cover 110. Integrating case external universal energy induction coils 900 can be done using an energy induction coils embedded into the tempered glass back cover 901, an energy induction coils printed onto tempered glass back cover 902, an energy induction coils embedded into a plastic sheet 903, and an energy induction coils printed onto a plastic sheet 904. Energy induction coils circuits coupled to internal electrical and electronic conductors 910 creates the integrated energy induction coil recharging system 113.

In one embodiment the Energy induction coils circuits coupled to internal electrical and electronic conductors 910 are connected to the flexible rechargeable batteries 106 of FIG. 1. The integrated energy induction coil recharging system 113 when placed on the energy induction coil recharging pad 120 of FIG. 1 charges the flexible rechargeable batteries 106.

In another embodiment the flow of power stored in the flexible rechargeable batteries 106 of FIG. 1 can be reversed wherein the electricity flows into the energy induction coil array integrated to the tempered glass back cover 110 wherein the energy passes from the energy induction coil array to a wireless charging system installed in a cell phone including a smart phone. The cell phone wireless charging is based on the principle of magnetic resonance, or Inductive Power Transfer (IPT). This is the process of transferring an electrical current between two objects through the use of coils to induce an electromagnetic field. This allows a user to have the convenience of wireless charging from the digital device air cushioned protective case with the tempered glass back cover 110 of FIG. 1 with integrated case external universal energy induction coils while remaining active and on the go without having to wait while the user's cell phone is wirelessly charging setting on a wirelessly charging pad or device.

Figure 9B:
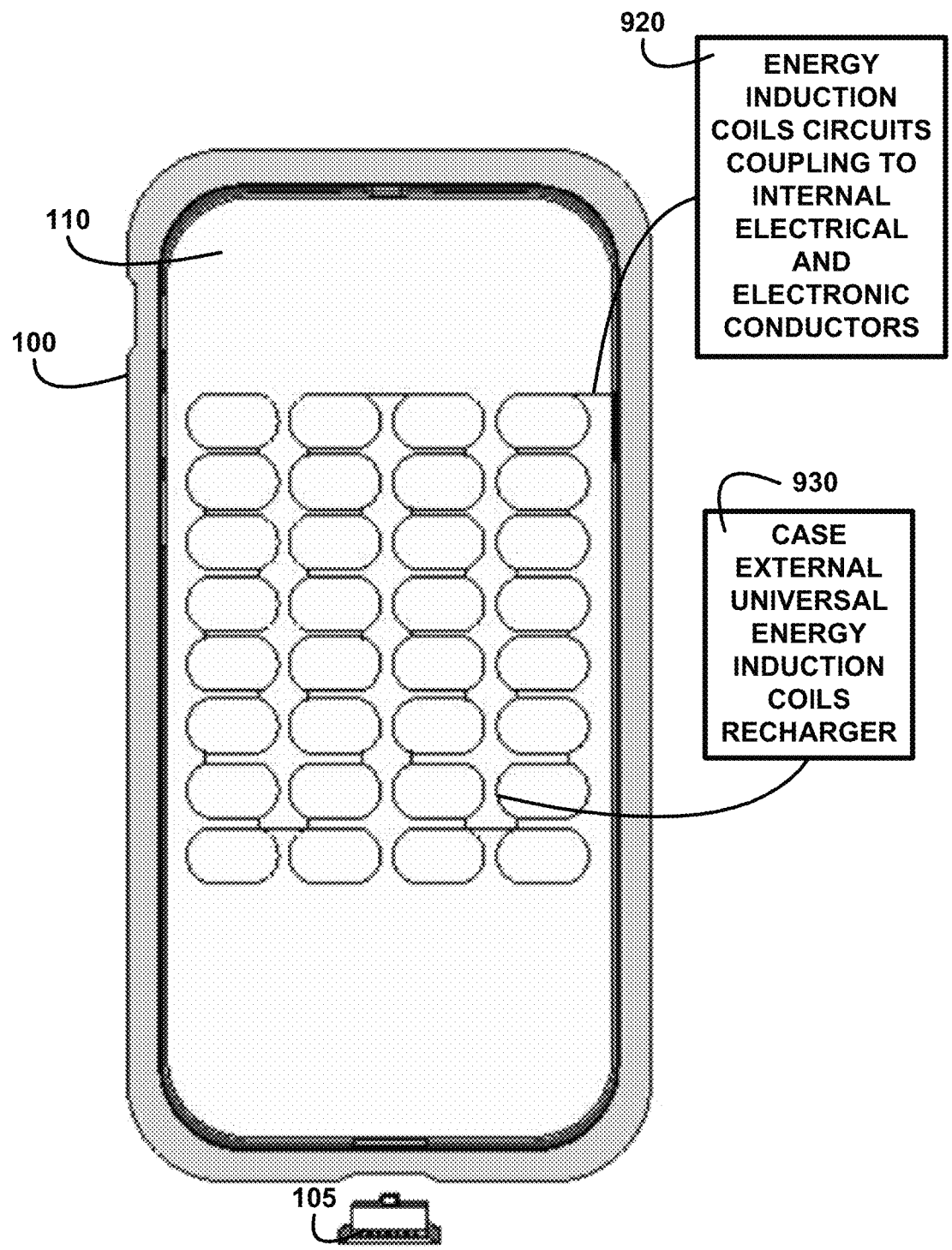
FIG. 9B shows for illustrative purposes only an example of case external universal energy induction coils recharger of one embodiment.

Case External Universal Energy Induction Coils Recharger:

FIG. 9B shows for illustrative purposes only an example of case external universal energy induction coils recharger of one embodiment. FIG. 9B shows the digital device protective case 100 with the tempered glass back cover 110 installed. Also shown is the USB plug with digital and recharging features 105. Energy induction coils circuits coupling to internal electrical and electronic conductors 920 create a case external universal energy induction coils recharger 930 of one embodiment.

Figure 10A:
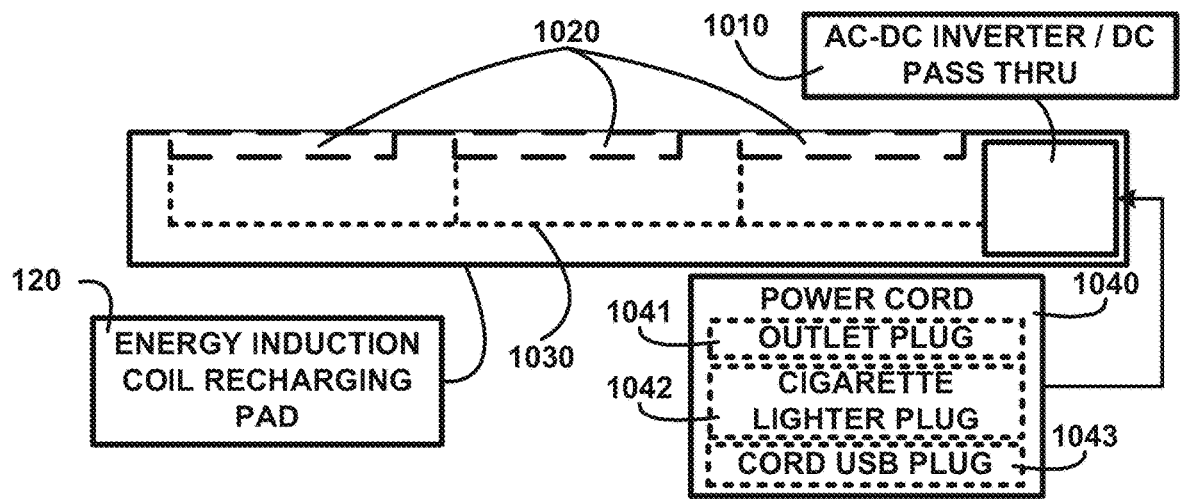
FIG. 10A shows for illustrative purposes only an example of a case external universal energy induction coils recharging pad of one embodiment.

Case External Universal Energy Induction Coils Recharging Pad:

FIG. 10A shows for illustrative purposes only an example of a case external universal energy induction coils recharging pad of one embodiment. FIG. 10A shows the energy induction coil recharging pad 120 in a side view including at least one case external universal energy induction coils recharging pad array 1020. An AC-DC inverter/DC pass thru 1010 is coupled to a power cord 1040 configured with an interchangeable outlet plug 1041, cigarette lighter plug 1042 and cord USB plug 1043. The AC-DC inverter/DC pass thru 1010 is coupled to a power cord 1040 configured with an interchangeable outlet plug 1041, cigarette lighter plug 1042 and cord USB plug 1043 can be respectively inserted into a typical house current outlet, a cigarette lighter in a vehicle or to a powered device with a USB outlet of one embodiment.

Figure 10B:
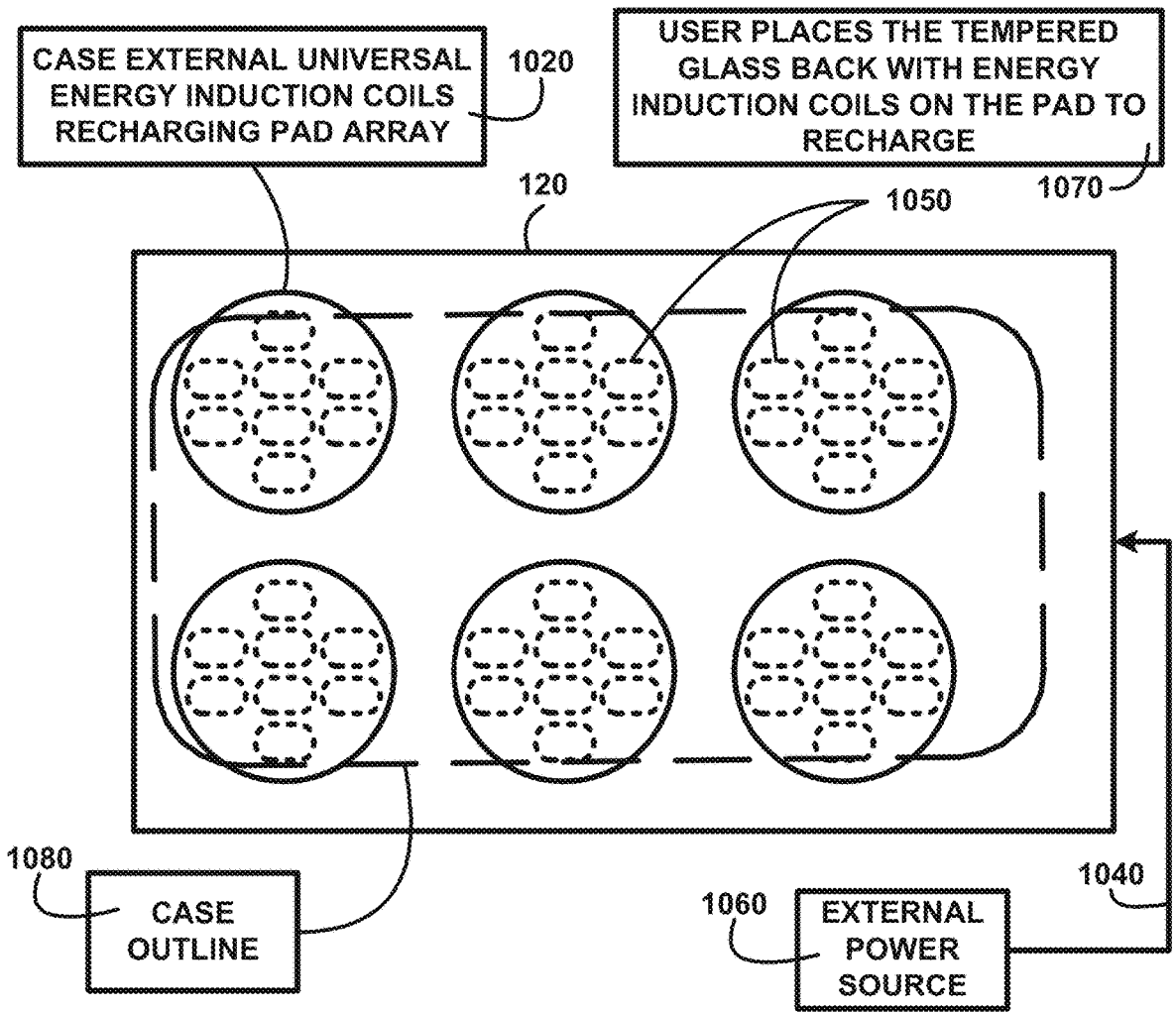
FIG. 10B shows for illustrative purposes only an example of a case external universal energy induction coils recharging pad array of one embodiment.

Case External Universal Energy Induction Coils Recharging Pad Array:

FIG. 10B shows for illustrative purposes only an example of a case external universal energy induction coils recharging pad array of one embodiment. FIG. 10B shows the energy induction coil recharging pad 120 top view that shows a plurality of energy induction coil 1050, the power cord 1040 coupled to an external power source 1060. The case external universal energy induction coils recharging pad array 1020 is used when a user places the tempered glass back with energy induction coils on the pad to recharge 1070 as shown with a case outline 1080 of one embodiment.

Case with Glue Ledge:

FIG. 11A shows for illustrative purposes only an example of case with glue ledge of one embodiment. FIG. 11A shows the digital device protective case 100 molded to include a tempered glass back cover glue ledge 1100. The tempered glass back cover glue ledge 1100 is configured for applying a glue to bond the tempered glass back cover 110 of FIG. 1 to the digital device protective case 100 wherein the tempered glass back cover glue ledge 1100 is configured to position the tempered glass back cover glue ledge 1100 is configured for applying a glue to bond the tempered glass back cover 110 of FIG. 1 outside surface flush with the adjacent case face of one embodiment.

Case with Solid Rubber Glue Platform:

FIG. 11B shows for illustrative purposes only an example of case with solid rubber glue platform of one embodiment. FIG. 11B shows the digital device protective case 100 molded to include a tempered glass back cover solid rubber glue platform 1110. The tempered glass back cover solid rubber glue platform 1110 is configured for applying a glue onto the surface of the tempered glass back cover solid rubber glue platform 1110 to bond the tempered glass back cover 110 of FIG. 1 to the digital device protective case 100 of one embodiment.

Digital Device Air Cushioned Protective Case with Glued Tempered Glass Back:

FIG. 11C shows for illustrative purposes only an example of digital device air cushioned protective case with glued tempered glass back of one embodiment. FIG. 11C shows the digital device protective case 100 with a tempered glass back cover 110 glued to the back side of the digital device protective case 100 of one embodiment.

In another embodiment the tempered glass back cover 110 can be configured to be glued to the back of any other type of cell phone case to provide additional protection.

Figure 12A:
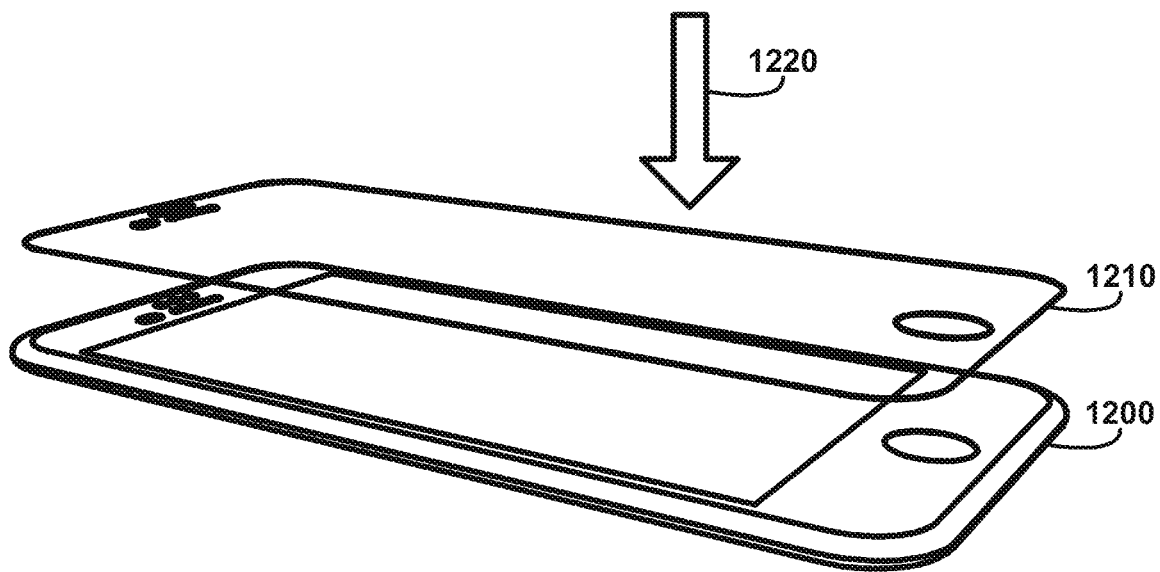
FIG. 12A shows for illustrative purposes only an example of installing a tempered glass front cover of one embodiment.

Installing a Tempered Glass Front Cover Process:

FIG. 12A shows for illustrative purposes only an example of installing a tempered glass front cover of one embodiment. FIG. 12A shows installing a tempered glass front cover on the surface of a cell phone 1220. The cell phone 1200 front screen has a glass surface. In one embodiment an installation process begins with wiping clean the glass surface of the cell phone 1200. A tempered glass front cover 1210 is positioned on the screen glass surface to match edges. The installation process continues with sliding with pressure applied a dry clean cloth from the center of the screen area outward to the edges to push air that may be trapped between the tempered glass front cover 1210 and the glass surface of the cell phone 1200. The tempered glass front cover 1210 will be coupled to the glass surface of the cell phone 1200 by the static friction occurring between the two glass surfaces. A protective case including the digital device protective case 100 of FIG. 1, a hard plastic bumper, and a metal bumper can be installed around the cell phone 1200 with the tempered glass front cover 1210 of one embodiment.

Figure 12B:
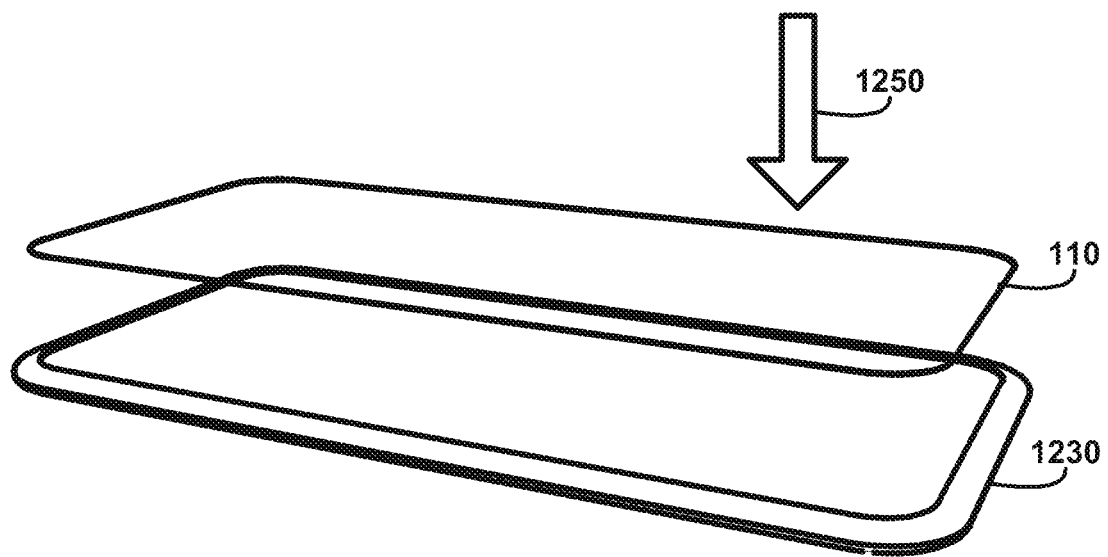
FIG. 12B shows for illustrative purposes only an example of installing a tempered glass back cover of one embodiment.

Installing a Tempered Glass Back Cover Process:

FIG. 12B shows for illustrative purposes only an example of installing a tempered glass back cover of one embodiment. FIG. 12B shows installing a tempered glass back cover on the surface of a cell phone back side 1250. The cell phone back side 1230 may have a glass surface. In one embodiment an installation process begins with wiping clean the glass surface of the cell phone back side 1230. A tempered glass back cover 110 is positioned on the screen glass surface to match edges. The installation process continues with sliding with pressure applied a dry clean cloth from the center of the screen area outward to the edges to push air that may be trapped between the tempered glass back cover 110 and the glass surface of the cell phone back side 1230. The tempered glass back cover 110 will be coupled to the glass surface of the cell phone back side 1230 by the static friction occurring between the two glass surfaces. A protective case including the digital device protective case 100 of FIG. 1, a hard plastic bumper, and a metal bumper can be installed around the cell phone 1200 of FIG. 12A with the tempered glass back cover 110 of one embodiment.

Figure 13A:
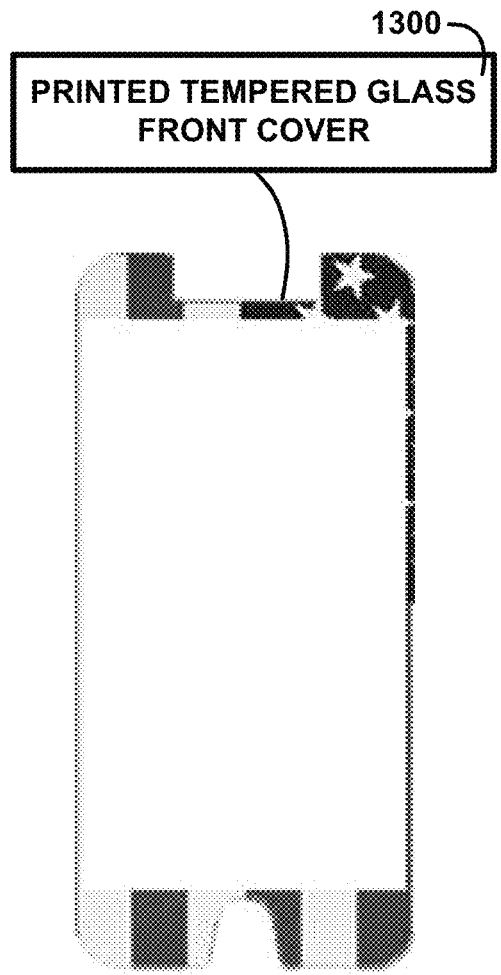
FIG. 13A shows for illustrative purposes only an example of a printed tempered glass front cover of one embodiment.

Printed Tempered Glass Front Cover:

FIG. 13A shows for illustrative purposes only an example of a printed tempered glass front cover of one embodiment. FIG. 13A shows a printed tempered glass front cover 1300. The printed tempered glass front cover 1300 can include any image to be printed on those portions of the tempered glass front cover that are not cut out for cell phone buttons, tabs or other protuberances, and may be clear for example to see the cell phone screen. A printed tempered glass front and back cover can be printed on an inside surface 1340 of one embodiment.

Figure 13B:
FIG. 13B shows for illustrative purposes only an example of a printed tempered glass back cover of one embodiment.

Printed Tempered Glass Back Cover:

FIG. 13B shows for illustrative purposes only an example of a printed tempered glass back cover of one embodiment. FIG. 13B shows a printed tempered glass back cover 1310. The printed tempered glass back cover 1310 can include any image to be printed on those portions of the tempered glass back cover that are not cut out for cell phone buttons, tabs or other protuberances. Printed tempered glass front and back covers can be installed in conjunction with a clear case over the printed tempered glass front and back covers 1320, the clear case not shown 1330 of one embodiment.

Slip and Snap Tempered Glass Cover Installation Features:

FIG. 14A shows for illustrative purposes only an example of a profile view of a protective case with slip and snap tempered glass cover installation features of one embodiment. FIG. 14A shows in one embodiment a digital device air cushioned protective case with slip and snap tempered glass cover installation features 1400. The digital device air cushioned protective case with slip and snap tempered glass cover installation features 1400 aids in positioning a tempered glass front cover 1210 and a tempered glass back cover 110 on a cell phone 1420. The digital device air cushioned protective case with slip and snap tempered glass cover installation features 1400 can include the slip and snap tempered glass cover installation features on one or both sides of the case. The slip and snap tempered glass cover installation features include a flexible slotted tab 1410 along one longitudinal inner edge of the digital device air cushioned protective case with slip and snap tempered glass cover installation features 1400. The flexible slotted tab 1410 is shown in more detail in detail 1401 and other FIGs. including 14C-F.

The slip and snap tempered glass cover installation features include a plurality of snap locking features 1460 appearing as protuberances spaced along the other three inner edges of the digital device air cushioned protective case with slip and snap tempered glass cover installation features 1400. The snap locking feature is shown in more detail in detail 1402 and FIG. 14B and FIG. 14G of one embodiment.

A Protective Case with Slip and Snap Tempered Glass Cover Installation Features:

FIG. 14B shows for illustrative purposes only an example of a top view of a protective case with slip and snap tempered glass cover installation features of one embodiment. FIG. 14B shows in one embodiment a digital device air cushioned protective case with slip and snap tempered glass cover installation features 1400. Shown is the flexible slotted tab 1410 along one longitudinal inner edge of the digital device air cushioned protective case with slip and snap tempered glass cover installation features 1400. Also showing is a plurality of snap locking features 1460 appearing as protuberances spaced along the other three inner edges of the digital device air cushioned protective case with slip and snap tempered glass cover installation features 1400 of one embodiment.

Slipping a Tempered Glass Cover into a Flexible Slotted Tab:

FIG. 14C shows for illustrative purposes only an example of slipping a tempered glass cover into a slip and snap tempered glass cover slot installation feature of one embodiment. FIG. 14C shows slipping a tempered glass cover into a flexible slotted tab 1410 pulled up to expose a receiver slot 1472 for the tempered glass cover 1441 angled. Also showing is the digital device air cushioned protective case with slip and snap tempered glass cover installation features 1400 and a glass surface of one side of a cell phone 1430 of one embodiment.

Pushed Towards a Cell Phone Glass Surface:

FIG. 14D shows for illustrative purposes only an example of a flexible slip and snap tempered glass cover installation feature pushed towards a cell phone glass surface of one embodiment. FIG. 14D shows a tempered glass cover 1441 installed into a flexible slotted tab 1410 of the digital device air cushioned protective case with slip and snap tempered glass cover installation features 1400. The angled flexible slotted tab 1410 and tempered glass cover 1441 is then pushed towards 1474 the glass surface of one side of a cell phone 1430. The flexible slotted tab 1410 can be made with for example a flexible rubber including thermoplastic polyurethane (TPU). The flexible slotted tab 1442 will have a recoil tension force built up when retracted into an angled position. This will aid in the pushing action. The flexible slotted tab 1410 is designed to return to its flattened position to position the insert tempered glass cover 1441 along the inner longitudinal inner edge which will position the whole tempered glass cover 1441 over the glass surface of one side of a cell phone 1430. The tempered glass cover 1441 also maintains some flexing. The tempered glass cover 1441 is held by the flexible slotted tab 1410 and provides an object to flex or bend the tempered glass presenting a curved surface towards the cell phone glass surface. Flexing the tempered glass cover 1441 during the pushing action will allow the flexed curved surface to touch the glass surface of one side of a cell phone 1430 nearest the flexible slotted tab 1410 first. The remainder of the curved surface will flatten as contact with the glass surface is made. Gradually the curved surface contact will push air out from between the tempered glass cover 1441 and glass surface of the cell phone of one embodiment.

Continuing a Push Toward a Cell Phone Glass Surface:

FIG. 14E shows for illustrative purposes only an example of a flexible slip and snap tempered glass cover installation feature continuing a push toward a cell phone glass surface of one embodiment. FIG. 14E shows continuing pushing 1476 the tempered glass cover 1441 onto the glass surface of the cell phone. FIG. 14E is also showing the flexible slotted tab 1410 recoiling to the digital device air cushioned protective case with slip and snap tempered glass cover installation features 1400. The flexed temper glass cover 1441 outward bend is facing the glass surface of one side of a cell phone 1430 of one embodiment.

Tempered Glass Cover Pressed Against a Cell Phone Glass Surface:

FIG. 14F shows for illustrative purposes only an example of a flexible slip and snap tempered glass cover installation pressed against a cell phone glass surface of one embodiment. FIG. 14F shows detail 1401 showing a tempered glass cover pressed against a cell phone glass surface in a flexible slip and snap tempered glass cover installation. The flexible slotted tab 1410 is shown recoiled to its original position on the digital device air cushioned protective case with slip and snap tempered glass cover installation features 1400 installed on the cell phone 1420. The flattened tempered glass cover 1444 is coupled to the glass surface of one side of a cell phone 1430 of FIG. 4C of one embodiment.

Tempered Glass Cover Snap Locking Feature:

FIG. 14G shows for illustrative purposes only an example of a flexible slip and snap tempered glass cover installation tempered glass cover snap locking feature of one embodiment. FIG. 14G shows detail 1402 of the digital device air cushioned protective case with slip and snap tempered glass cover installation features 1400 installed on the cell phone 1420. The flattened tempered glass cover 1444 is pressed beneath the plurality of snap locking features 1460 of one embodiment.

Figure 15A:
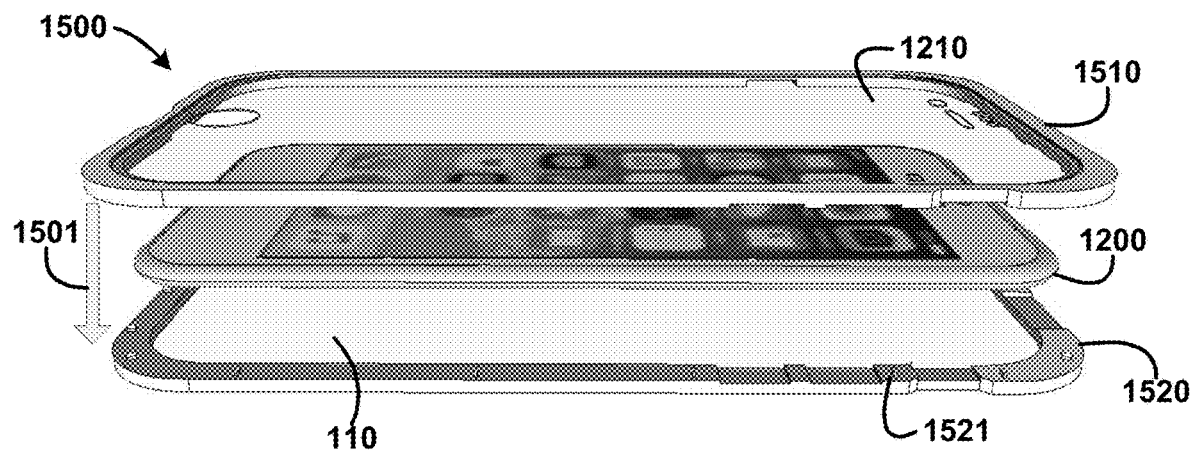
FIG. 15A shows for illustrative purposes only an example of a top and bottom two-part snap together protective case with glued tempered glass covers of one embodiment.

Two-Part Snap Together Protective Case Orientation:

FIG. 15A shows for illustrative purposes only an example of a top and bottom two-part snap together protective case with glued tempered glass covers of one embodiment. FIG. 15A shows top and bottom two-part snap together protective case with glued tempered glass covers 1500 oriented above and below a cell phone 1200. The cell phone is lowered into a bottom snap together section 1520. The bottom snap together section 1520 includes a plurality of a snapping tab 1521 and a tempered glass back cover 110 glued in place of one embodiment.

Figure 15B:
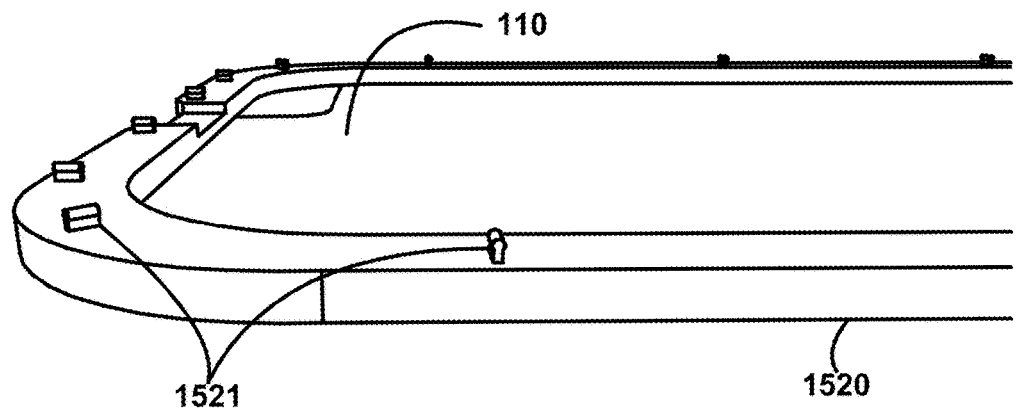
FIG. 15B shows for illustrative purposes only an example of a bottom section of a two-part snap together protective case with a glued tempered glass back cover of one embodiment.
Figure 15C:
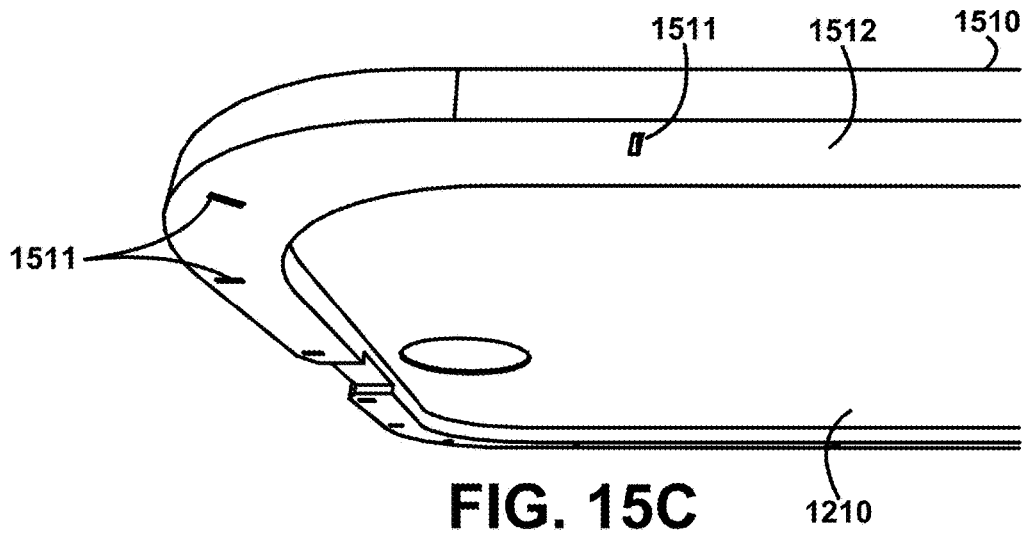
FIG. 15C shows for illustrative purposes only an example of a top section of a two-part snap together protective case with a glued tempered glass front cover of one embodiment.

A top snap together section 1510 includes a plurality of a snapping tab receptacle 1511 shown in FIG. 15C and a tempered glass front cover 1210 glued in place. The top snap together section 1510 is lowered 1501 onto the bottom snap together section 1520 and aligned with the plurality of a snapping tab 1521. A user applies pressure to push the snapping tabs into the snapping tab receptacles. The top and bottom two-part snap together protective case with glued tempered glass covers 1500 includes air cushion compartments in the body of the two-parts of the protective case not shown of one embodiment.

Bottom Section of a Two-Part Snap Together Protective Case:

FIG. 15B shows for illustrative purposes only an example of a bottom section of a two-part snap together protective case with a glued tempered glass back cover of one embodiment. FIG. 15B shows a bottom section of a two-part snap together protective case 1520 with a glued tempered glass back cover 110 and a plurality of a snapping tab 1521 of one embodiment.

Top Section of a Two-Part Snap Together Protective Case:

FIG. 15C shows for illustrative purposes only an example of a top section of a two-part snap together protective case with a glued tempered glass front cover of one embodiment. FIG. 15C shows a top section of a two-part snap together protective case 1510 with a glued tempered glass front cover 1210 and a plurality of a snapping tab receptacle 1511 on the mating face 1512 of the top section of a two-part snap together protective case 1510. The snapping tab receptacle 1511 is recessed into the mating face 1512 and is configured to accept the snapping tab 1521 and snap the two-parts together. The two-parts can be pried apart to remove the cell phone 1200 of one embodiment.

Two-Part Slide and Snap Together Protective Case:

FIG. 16A shows for illustrative purposes only an example of a two-part slide and snap together protective case with glued tempered glass covers of one embodiment. FIG. 16A shows a two-part slide and snap together protective case with glued tempered glass covers 1600 including a slide receiver section 1610 including hollowed slider shaft channels 1611 and a tempered glass back cover 110 and a tempered glass front cover 1210 both of which are glued to the slide receiver section 1610 of one embodiment.

A slider section 1620 includes a slider shaft extension 1621 on both sides that are configured to slide into 1630 the hollowed slider shaft channels 1611 and snap in place using a snapping tab and receptacle not shown. Each slider shaft extension 1621 is aligned with the corresponding the hollowed slider shaft channel 1611 and the slider section 1620 is pushed towards the slide receiver section 1610 until the two section parts snap together. The two-part slide and snap together protective case with glued tempered glass covers 1600 includes air cushion compartments in the body of the protective case not entirely shown of one embodiment.

Cell Phone Insertion into a Receiver Section:

FIG. 16B shows for illustrative purposes only an example of a cell phone insertion into a slide receiver section of a two-part slide and snap together protective case with glued tempered glass covers of one embodiment. FIG. 16B shows a cell phone 1200 insertion 1640 into a slide receiver section 1610 between the tempered glass back cover 110 and a tempered glass front cover 1210 of one embodiment.

Sliding a Bottom Section into a Receiver Section:

FIG. 16C shows for illustrative purposes only an example of sliding a slider section into a receiver section of a two-part slide and snap together protective case with glued tempered glass covers of one embodiment. FIG. 16C shows the slide receiver section 1610 and a tempered glass front cover 1210 glued to the slide receiver section 1610. A slider section 1620 includes a slider shaft extension 1621 on both sides. When the cell phone 1200 is inserted the slider section 1620 is aligned and pushed to slide the slider shaft extension 1660 into the slide receiver section 1610 and snap locked in place of one embodiment.

Cell Phone Installed in a Two-Part Slide and Snap Together Protective Case:

FIG. 16D shows for illustrative purposes only an example of a cell phone installed in a two-part slide and snap together protective case with glued tempered glass covers of one embodiment. FIG. 16D shows the cell phone 1200 of FIG. 12A installed in a two-part slide and snap together protective case with glued tempered glass covers 1600 after the slide receiver section 1610 and the slider section 1620 have been mated and slid together of one embodiment.

Figure 17A:
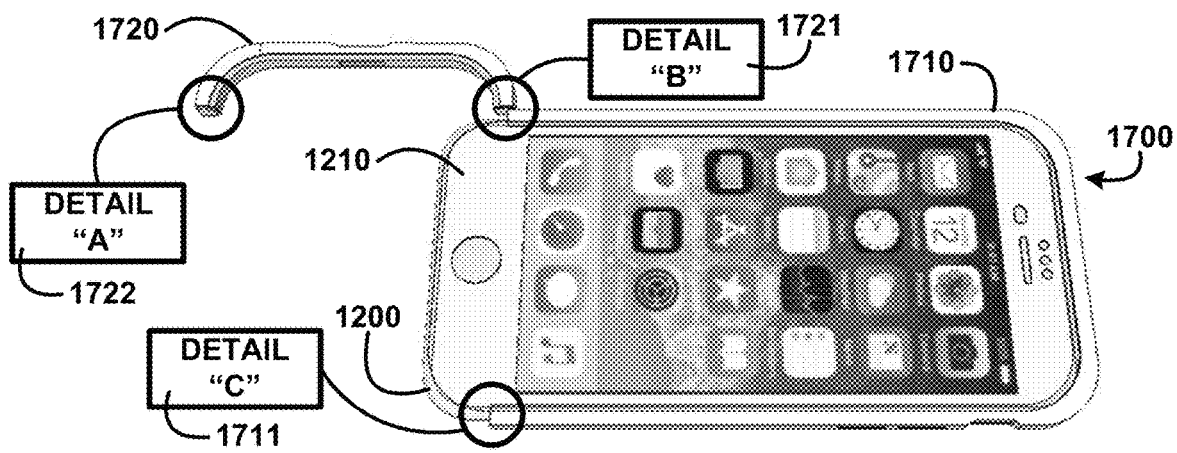
FIG. 17A shows for illustrative purposes only an example of a protective case with glued tempered glass covers with a hinged snap section of one embodiment.

Protective Case with a Hinged Snap Section:

FIG. 17A shows for illustrative purposes only an example of a protective case with glued tempered glass covers with a hinged snap section of one embodiment. FIG. 17A shows a protective case with glued tempered glass covers with a hinged snap section 1700. The protective case with glued tempered glass covers with a hinged snap section 1700 can be configured with a hinged snap section 1720 at one end of the protective case or the other. A hinged receiver section 1710 includes a tempered glass front cover 1210 and a tempered glass back cover 110 of FIG. 1 glued to the protective case of one embodiment.

A cell phone 1200 is inserted into the hinged receiver section 1710 between the glued in position tempered glass front cover 1210 and a tempered glass back cover 110 of FIG. 1. The hinged snap section 1720 includes a flexible hinge coupled to both the hinged snap section 1720 and hinged receiver section 1710 as shown in Detail "B" 1721 and Detail "D" of FIGS. 17D-F. The hinged snap section 1720 includes a snap tab receiver 1724 as shown in Detail "A" 1722. The hinged receiver section 1710 includes a snap tab 1712 as shown in Detail "C" 1711. The protective case with glued tempered glass covers with a hinged snap section 1700 includes air cushion compartments in the body of the protective case sections not shown of one embodiment.

Figure 17B:
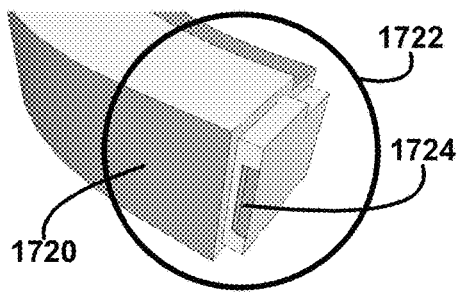
FIG. 17B shows for illustrative purposes only an example of a hinged snap section snap lock receptacle of one embodiment.

Hinged Snap Section Snap Lock Receptacle:

FIG. 17B shows for illustrative purposes only an example of a hinged snap section snap lock receptacle of one embodiment. FIG. 17B shows Detail "A" 1722 including one hinged end of the hinged snap section 1720 and the snap lock receptacle 1724 of one embodiment.

Figure 17C:
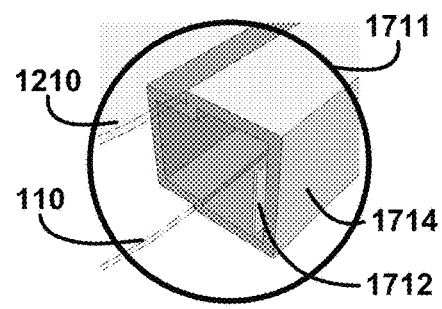
FIG. 17C shows for illustrative purposes only an example of a protective case with glued tempered glass covers receiver section snap lock tab of one embodiment.

Hinged Receiver Section Snap Lock Tab:

FIG. 17C shows for illustrative purposes only an example of a protective case with glued tempered glass covers receiver section snap lock tab of one embodiment. FIG. 17C shows Detail "C" 1711 including a hinged side of the hinged receiver section 1710 includes a tempered glass front cover 1210 and a tempered glass back cover 110 of FIG. 1 glued to the protective case. Also shown is the hollow air cushion compartment 1714 with a snap tab lock 1712 coupled on the outer inside surface of one embodiment.

Figure 17D:
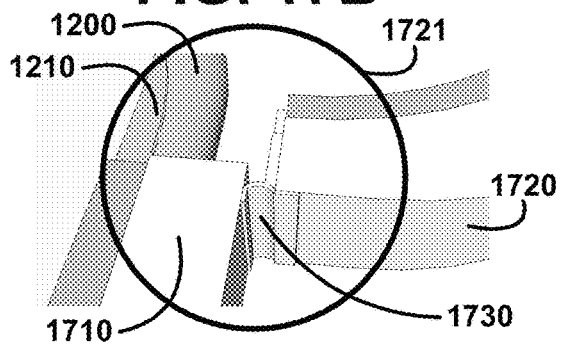
FIG. 17D shows for illustrative purposes only an example of a hinged snap section hinge in an opened position of one embodiment.

Hinge in an Opened Position:

FIG. 17D shows for illustrative purposes only an example of a hinged snap section hinge in an opened position of one embodiment. FIG. 17D shows Detail "B" 1721 including a flexible hinge in an opened position 1730 coupled to both the hinged snap section 1720 and hinged receiver section 1710. The hinged receiver section 1710 includes the glued in position tempered glass front cover 1210 and a tempered glass back cover 110 of FIG. 1 of one embodiment.

Figure 17E:
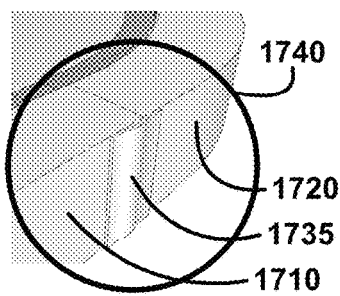
FIG. 17E shows for illustrative purposes only an example of a hinged snap section hinge in a closed position of one embodiment.

Hinge in a Closed Position:

FIG. 17E shows for illustrative purposes only an example of a hinged snap section hinge in a closed position of one embodiment. FIG. 17E shows Detail "D" 1740 including a flexible hinge in a closed position 1735 coupled to both the hinged snap section 1720 and hinged receiver section 1710 of one embodiment.

Figure 17F:
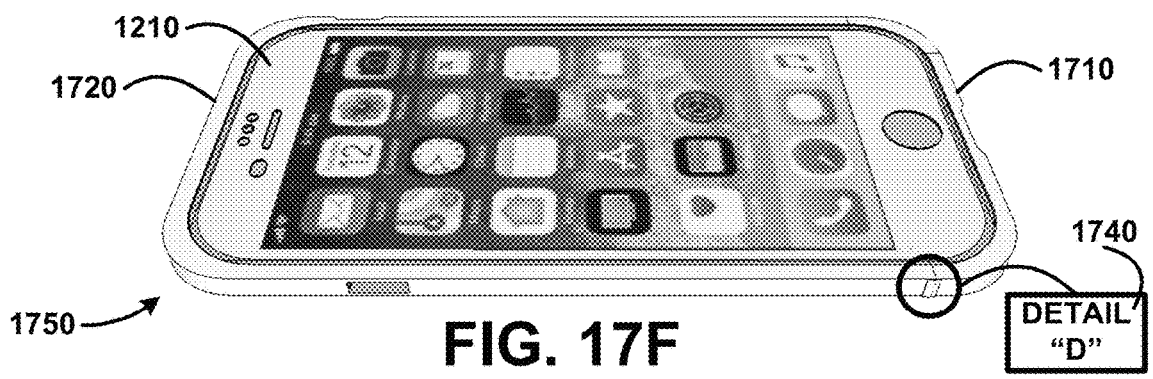
FIG. 17F shows for illustrative purposes only an example of a cell phone installed in a protective case with glued tempered glass covers with a hinged snap section of one embodiment.

Cell Phone Installed in a Protective Case with a Hinged Snap Section:

FIG. 17F shows for illustrative purposes only an example of a cell phone installed in a protective case with glued tempered glass covers with a hinged snap section of one embodiment. FIG. 17F shows a cell phone installed in a protective case with glued tempered glass covers with a hinged snap section 1750. The tempered glass front cover 1210 is shown glued in position on the hinged receiver section. Detail "D" 1740 is shown in more detail in FIG. 17E. The hinged snap section 1720 and hinged receiver section 1710 are shown in a closed hinged position and snap locked with the cell phone 1200 of FIG. 12A installed of one embodiment.

The foregoing has described the principles, embodiments and modes of operation of the embodiments. However, the embodiments should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:

creating a flexible rubber digital device protective case;

integrating features in the flexible rubber digital device protective case including internal air cushion corner and side pockets;

wherein the internal air cushion corner and side pockets are configured to hold compressible air within the internal air cushion pocket cavities for absorbing a force applied against the flexible rubber digital device protective case;

wherein the internal air cushion corner and side pockets are configured to be formed using a mold and molding process using a flexible rubber including thermoplastic polyurethane;

wherein the internal air cushion side pockets are configured for installing flexible rechargeable batteries and wherein the internal air cushion side pockets are configured for installing at least one power conductive buss; and integrating features in the flexible rubber digital device protective case including a front tempered glass cover and a back tempered glass cover, and wherein the front and back tempered glass covers are configured to be coupled to the flexible rubber digital device protective case using one of a group of flexible rubber digital device protective case integrated features.

2. The method of claim 1, further comprising integrating a fingerprint recognition device locking system to the back tempered glass covers configured for including an external universal fingerprint thermal imprint pad and a fingerprint thermal digitizer.

3. The method of claim 1, further comprising integrating a solar cell recharging power source to the back tempered glass cover includes a plurality of flexible photo/light power converters in a array and outgoing circuits for connection to at least one power conductive buss.

4. The method of claim 1, further comprising integrating an energy induction coil recharging system to the back tempered glass cover including a plurality of energy induction coils in a array and outgoing circuits for connection to at least one power conductive buss.

5. The method of claim 1, further comprising integrating a fingerprint recognition device locking system to the back tempered glass cover includes a fingerprint thermal digitizer for detecting fingerprint patterns and creating coordinate image points and transmitting detected fingerprint pattern coordinate image points to a digital memory device for recording.

6. The method of claim 1, further comprising creating a top and bottom two-part snap together flexible rubber digital device protective case with tempered glass covers.

7. The method of claim 1, further comprising integrating a tempered glass retainer channel into the flexible rubber digital device protective case configured for coupling the front and back tempered glass covers onto the flexible rubber digital device protective case.

8. The method of claim 1, further comprising integrating slip and snap tempered glass cover installation features into the flexible rubber digital device protective case configured for coupling the front and back tempered glass covers to the flexible rubber digital device protective case.

9. The method of claim 1, wherein the compressible air within the internal air cushion pocket cavities recoils due to increased pressure caused by a force being applied against the flexible rubber digital device protective case, and wherein recoiling compressed air returns a digital device air cushioned protective case to its original shape.

* * * * *